(12) United States Patent
Dziubla et al.

(10) Patent No.: US 8,642,087 B1
(45) Date of Patent: Feb. 4, 2014

(54) COMPOUNDS AND METHODS FOR REDUCING OXIDATIVE STRESS

(75) Inventors: Thomas D. Dziubla, Frankfort, KY (US); J. Zach Hilt, Lexington, KY (US); Dipti Biswal, Virginia Beach, VA (US); David B. Cochran, Lexington, KY (US); Paritosh P. Wattamwar, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 192 days.

(21) Appl. No.: 13/290,752

(22) Filed: Nov. 7, 2011

Related U.S. Application Data

(60) Provisional application No. 61/456,419, filed on Nov. 5, 2010.

(51) Int. Cl.
*A61K 31/78* (2006.01)

(52) U.S. Cl.
USPC ............................ 424/487; 424/761; 428/1.31

(58) Field of Classification Search
USPC .............................. 525/374; 424/486; 508/454
See application file for complete search history.

(56) References Cited

U.S. PATENT DOCUMENTS

| | | | | |
|---|---|---|---|---|
| 3,956,224 | A * | 5/1976 | Chu | 525/374 |
| 3,989,741 | A * | 11/1976 | Parker | 560/217 |
| 5,897,879 | A * | 4/1999 | Friedman et al. | 424/486 |
| 7,427,394 | B2 | 9/2008 | Anderson et al. | |
| 2006/0167212 | A1* | 7/2006 | Jin | 528/218 |
| 2007/0010632 | A1 | 1/2007 | Kaplan et al. | |
| 2008/0090742 | A1* | 4/2008 | Mathur | 508/454 |
| 2008/0145338 | A1 | 6/2008 | Anderson et al. | |
| 2008/0242626 | A1 | 10/2008 | Zugates et al. | |
| 2008/0279764 | A1 | 11/2008 | Manganaro et al. | |
| 2009/0082480 | A1* | 3/2009 | Piletsky et al. | 521/147 |
| 2010/0036084 | A1 | 2/2010 | Langer et al. | |
| 2010/0098653 | A1 | 4/2010 | Yu et al. | |

FOREIGN PATENT DOCUMENTS

| | | |
|---|---|---|
| WO | 9716407 | 5/1997 |
| WO | 2005055979 | 6/2005 |
| WO | 2010083379 | 7/2010 |

OTHER PUBLICATIONS

Williams, S. R.; Lepene, B. S.; Thatcher, C. D.; Long, T. E., Synthesis and Characterization of Poly(ethylene glycol)- Glutathione Conjugate Self-Assembled Nanoparticles for Antioxidant Delivery. Biomacromolecules 2009, 10, (1), 155-161.
Woo, H. B.; Shin, W. S.; Lee, S.; Ahn, C. M., Synthesis of novel curcumin mimics with asymmetrical units and their anti-angiogenic activity. Bioorganic & Medicinal Chemistry Letters 2005, 15, (16), 3782-3786.
Choi YJ, Jeong YJ, Lee YJ, Kwon HM, Kang YH. (-)Epigallocatechin gallate and quercetin enhance survival signaling in response to oxidant-induced human endothelial apoptosis. J Nutr 2005;135:707-13.
Choi YJ, Kang JS, Park JHY, Lee YJ, Choi JS, Kang YH. Polyphenolic flavonoids differ in their antiapoptotic efficacy in hydrogen peroxide-treated human vascular endothelial cells. J Nutr 2003;133:985-91.
Akinc, A.; Lynn, D. M.; Anderson, D. G.; Langer, R. J Am ChemSoc 2003, 125, 5316.
Anderson, D. G.; Lynn, D. M.; Langer, R., Semi-automated synthesis and screening of a large library of degradable cationic polymers for gene delivery. Angewandte Chemie-International Edition 2003, 42, (27), 3153-3158.
Anderson, D. G.; Tweedie, C. A.; Hossain, N.; Navarro, S. M.; Brey, D. M.; Van Vliet, K. J.; Langer, R.; Burdick, J. A., A combinatorial library of photocrosslinkable and degradable materials. Advanced Materials 2006, 18, (19), 2614-+.
Badylak, S. F.; Valentin, J. E.; Ravindra, A. K.; McCabe, G. P.; Stewart-Akers, A. M., Macrophage Phenotype as a Determinant of Biologic Scaffold Remodeling. Tissue Engineering Part A 2008, 14, (11), 1835-1842.
Bat, E.; Plantinga, J. A.; Harmsen, M. C.; van Luyn, M. J. A.; Feijen, J.; Grijpma, D. W., In vivo behavior of trimethylene carbonate and epsilon-caprolactone-based (co)polymer networks: Degradation and tissue response. Journal of Biomedical Materials Research Part A 2010, 95A, (3), 940-949.
Berry, D.; Lynn, D. M.; Sasisekharan, R.; Langer, R. Chem Bio 2004, 11, 487.
Biswal, D.; Wattamwar, P. P.; Dziubla, T. D.; Hilt, J. Z., A single-step polymerization method for poly(β-amino ester) biodegradable hydrogels. Macromolecules Submitted, Dec. 2011.
Boudreaux, C. J.; Bunyard, W. C.; McCormick, C. L., Controlled activity polymers .8. Copolymers of acrylic acid and isomeric N-akylacrylamide with pendent beta-naphthol esters moieties: Synthesis and characterization. Journal of Controlled Release 1996, 40, (3), 223-233.
Brandrup, J.; Immergut, E.H.; Grulke, E. A. Polymer handbook. 4th ed., New York: John Wiley, 1999.
Brey, D. M.; Ifkovits, J. L.; Mozia, R. I.; Katz, J. S.; Burdick, J. AActaBiomat 2008, 4, 207.
Brey, D. M.; Reickson, I.; Burdick, J. A. J Biomed Mater Res A. 2008,85, 731.

(Continued)

Primary Examiner — Walter Webb
(74) Attorney, Agent, or Firm — Stites & Harbison PLLC; Terry L. Wright

(57) ABSTRACT

Antioxidant polymeric compounds are provided that comprise a plurality of monomeric portions, where each monomeric portion includes an antioxidant molecule interposed between at least two acrylate molecules, and where at least one acrylate molecule of each monomeric portion is linked by a diamine molecule to an acrylate molecule of an adjacent monomeric portion to thereby form the polymer. Methods of synthesizing polymeric compounds and methods of using the antioxidant polymeric compounds to reduce oxidative stress are also provided.

34 Claims, 20 Drawing Sheets

(56) References Cited

OTHER PUBLICATIONS

Brito, L; Little, S.; Langer, R.; Amiji, M. Biomacromolecules 2008, 9, 1179.

Burkoth, A. K.; Anseth, K. A. Biomaterials 2000, 21, 2395.

Butterfield, D. A.; Lange, M. L. B.; Sultana, R., Involvements of the lipid peroxidation product, HNE, in the pathogenesis and progression of Alzheimer's disease. Biochimica Et Biophysica Acta-Molecular and Cell Biology of Lipids 2010, 1801, (8), 924-929.

Chen, J.; Huang, S-W.; Liu, M.; Zhuo, R-X. Polymer 2007, 48, 675.

Devalapally, H.; Shenoy, D.; Little, S.; Langer, R.; Amiji, M. Cancer Chemotherapy and Pharmacology 2007, 59, 477.

Dinç, C.Ö.; Kibarer, G.; Güner, A. J Appl Poly Sci 2010, 117, 1100.

Fleming, C.; Maldjian, A.; Da Costa, D.; Rullay, A. K.; Haddleton, D. M.; John, J. S.; Penny, P.; Noble, R. C.; Cameron, N. R.; Davis, B. G., A carbohydrate-antioxidant hybrid polymer reduces oxidative damage in spermatozoa and enhances fertility. Nature Chemical Biology 2005, 1, (5), 270-274.

Frimpong, R. A.; Fraser, S.; Hilt, J.Z. J Biomed Mater Res: Part A 2006, 80A, 1.

Fu, K.; Pack, D. W.; Klibanov, A. M.; Langer, R., Visual evidence of acidic environment within degrading poly(lactic-coglycolic acid) (PLGA) microspheres. Pharmaceutical Research 2000, 17, (1), 100-106.

Green, J. J.; Langer, R.; Anderson, D. G. Accounts of Chemical Research 2008, 41, 749.

Hawkins, A. M.; Milbrandt, T. A.; Puleo, D. A.; Hilt, J. Z. Acta Bio 2011 (in press).

Hoffman, A. S Adv Drug Delivery Rev 2002, 43, 3.

Ifkovits, J. L.; Burdick, J. A. Tissue Engineering 2007, 13, 2369.

Jere, D.; Xu, C-X.; Arote, R.; Yun, C-H.; Cho, M-H.; Cho, C-S. Biomaterial 2008, 29, 2535.

Jiang, W. W.; Su, S. H.; Eberhart, R. C.; Tang, L. P., Phagocyte responses to degradable polymers. Journal of Biomedical Materials Research Part A 2007, 82A, (2), 492-497.

Kaplan, S. S.; Basford, R. E.; Mora, E.; Jeong, M. H.; Simmons, R. L., Biomaterial-Induced Alterations of Neutrophil Superoxide Production. Journal of Biomedical Materials Research 1992, 26, (8), 1039-1051.

Kim, T.; Seo, H. J.; Choi, J. S.; Yoon, J. K.; Baek, J-u.; Kim, K.; Park, J-S. Bioconjugate Chem. 2005, 16, 1140.

Krevelen, D.W.v., Properties of polymers: their correlation with chemical structure, their numerical estimation and prediction from additive group contributions. 3rd, completely rev. ed., Amsterdam; New York: Elsevier. xxii,1990, 875 p.

Kutuk, O.; Adli, M.; Poli, G.; Basaga, H., Resveratrol protects against 4-HNE induced oxidative stress and apoptosis in Swiss 3T3 fibroblasts. Biofactors 2004, 20, (1), 1-10.

Lee, J-S.; Green, J. J.; Love, K.; Sunshine, J.; Langer, R.; Anderson, D. G. Nano Let 2009, 9, 2402.

Li, N.; Liu, J. J H. Zhang, J.; Yu, B. Y., Comparative evaluation of cytotoxicity and antioxidative activity of 20 flavonoids. Journal of Agricultural and Food Chemistry 2008, 56, (10), 3876-3883.

Lim, Y. B.; Kim, C. H.; Kim, K.; Kim, S. W.; Park, J. S. J Am ChemSoc 2000, 122, 6524e5.

Liu, W. E.; Ma, M. L.; Bratlie, K. M.; Dang, T. T.; Langer, R.; Anderson, D. G., Real-time in vivo detection of biomaterial-induced reactive oxygen species. Biomaterials 2011, 32, (7), 1796-1801.

Lynn, D. M.; Anderson, D. G.; Putnam, D.; Langer, R. J Am ChemSoc 2001, 123, 8155.

Lynn, D. M.; Langer, R. J. Am. Chem. Soc. 2000, 122, 10761.

Mann, B. K.; Gobin, A. S.; Tsai, A.T.; Schmedlen, R. H.; West, J. L. Biomaterials 2001, 22, 3045.

Matsuo, M.; Sasaki, N.; Saga, K.; Kaneko, T., Cytotoxicity of flavonoids toward cultured normal human cells. Biological & Pharmaceutical Bulletin 2005, 28, (2), 253-259.

Schmidt, D. R.; Kao, W. J., Monocyte activation in response to polyethylene glycol hydrogels grafted with RGD and PHSRN separated by interpositional spacers of various lengths. Journal of Biomedical Materials Research Part A 2007, 83A, (3), 617-625.

Shen, Y.; Tang, H.; Zhan, Y.; VanKirk, E. A.; Murdoch, W. J. Nanomedicine: nanotechnology, biology and medicine 2009, 5, 192.

Shenoy, D.; Little, S.; Langer, R.; Amiji, M. Pharmaceutical research 2005, 22, 2017.

Spizzirri, U. G.; Iemma, F.; Puoci, F.; Cirillo, G.; Curcio, M.; Parisi, O. I.; Picci, N., Synthesis of Antioxidant Polymers by Grafting of Gallic Acid and Catechin on Gelatin. Biomacromolecules 2009, 10, (7), 1923-1930.

Tan, H.; Marra, K. G. Materials 2010, 3, 1746.

Udipi, K.; Omberg, R. L.; Thurmond, K. B.; Settle, S. L.; Forster, D.; Riley, D., Modification of inflammatory response to implanted biomedical materials in vivo by surface bound superoxide dismutase mimics. Journal of Biomedical Materials Research 2000, 51, (4), 549-560.

Usatyuk, P. V.; Natarajan, V., Role of mitogen-activated protein kinases in 4-hydroxy-2-nonenal-induced actin remodeling and barrier function in endothelial cells. Journal of Biological Chemistry 2004, 279, (12), 11789-11797.

Usatyuk, P. V.; Parinandi, N. L.; Natarajan, V., Redox regulation of 4-hydroxy-2-nonenal-mediated endothelial barrier dysfunction by focal adhesion, adherens, and tight junction proteins. Journal of Biological Chemistry 2006, 281, (46), 35554-35566.

Wang, Y. Z.; Singh, A.; Xu, P.; Pindrus, M. A.; Blasioli, D. J.; Kaplan, D. L., Expansion and osteogenic differentiation of bone marrow-derived mesenchymal stem cells on a vitamin C functionalized polymer. Biomaterials 2006, 27, (17), 3265-3273.

Wattamwar, P. P.; Hardas, S.; Butterfield, D. A.; Anderson, K. W.; Dziubla, T. D., Tuning of the Pro-oxidant and Antioxidant Activity of Trolox Through the Controlled Release from Biodegradable Poly(trolox ester) Polymers. J Biomed Mater Res A in Press, Aug. 16, 2011.

Wattamwar, P. P.; Mo, Y. Q.; Wan, R.; Palli, R.; Zhang, Q. W.; Dziubla, T. D., Antioxidant Activity of Degradable Polymer Poly(trolox ester) to Suppress Oxidative Stress Injury in the Cells. Advanced Functional Materials 2010, 20, (1), 147-154.

* cited by examiner

COMPOUNDS AND METHODS FOR REDUCING OXIDATIVE STRESS

RELATED APPLICATIONS

This application claims priority from U.S. Provisional Application Ser. No. 61/456,419, filed Nov. 5, 2010, the entire disclosure of which is incorporated herein by this reference.

GOVERNMENT SUPPORT

This invention was made with government support under grant number N000140911156 from the U.S. Office of Naval Research. The government has certain rights in the invention.

TECHNICAL FIELD

The presently-disclosed subject matter relates to compounds and methods for reducing oxidative stress. In particular, the presently-disclosed subject matter relates to compounds and methods for reducing oxidative stress, wherein biodegradable, antioxidant polymeric compounds are configured to degrade over a time period and provide a sustained release of an antioxidant molecule.

BACKGROUND

Oxidative stress is a key mechanism in the pathogenesis of a multitude of diseases and disorders. Indeed, hyperoxia, hypoxia, ischemia, cytokines, hyperhycemia, and other pathological factors have each been shown to induce endothelial production of toxic oxidants and the expression of cell adhesion molecules that are then used by leukocytes to bind to and migrate through endothelial cells. Moreover, the oxidants produced by endothelial cells and released by leukocytes damage the endothelium, thereby inducing a vicious cycle of inflammation, edema, thrombosis, and vascular dysfunctions, all of which further propagate primary disease conditions.

More recently, studies have also linked biodegradable biomaterial-induced inflammatory responses to cellular oxidative stress, where inflammatory cells such as macrophages release a plethora of inflammatory cytokines and reactive oxygen and nitrogen species (ROS and RNS) [4, 39, 44]. In the case of biodegradable polymers, this biomaterial-induced inflammation and toxicity is often a result of local accumulation of polymer degradation products. As such, the conjugation of antioxidant molecules to polymers has been proposed as one means by which biomaterial-induced inflammation and oxidative stress may be suppressed [18, 42, 44, 47, 50]. To date, however, these conjugated antioxidant polymer systems have only been capable of incorporating a low percent content of antioxidants as compared to the bulk material and have only been capable of incorporating a limited range of antioxidants. Other systems have produced polymers with one-hundred percent antioxidant content, but those systems have exhibited limited control over degradation rates of the polymers and have also shown to only be a capable of being extended to a few other antioxidants. For example, a poly(trolox ester) polymer or, in other words, a polymer of trolox (the water-soluble analogue of tocopherol) has been developed that has one-hundred percent antioxidant content, but has been shown to undergo enzymatic degradation and to be limited by its lack of hydrolytic degradation, leaving very little control over its degradation rate.

Accordingly, a polymeric biomaterial that provides enhanced control over the degradation rate of the biomaterial, but yet also is capable of incorporating a sufficient variety and/or amount of antioxidants in the polymer system would be both highly-desirable and beneficial for reducing oxidative stress.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned, likewise, those features can be applied to other embodiments of the presently disclosed subject matter, whether listed in this Summary or not. To avoid excessive repetition, this Summary does not list or suggest all possible combinations of such features.

The presently-disclosed subject matter includes compounds and methods for reducing oxidative stress, wherein biodegradable, antioxidant polymeric compounds are configured to degrade over a time period and provide a sustained release of an antioxidant molecule.

In some embodiments of the presently-disclosed subject matter, an antioxidant polymeric compound is provided that comprises a plurality of monomeric portions, where each monomeric portion includes an antioxidant molecule interposed between at least two acrylate molecules, and where at least one acrylate molecule of each monomeric portion is linked by a diamine molecule to an acrylate molecule of an adjacent monomeric portion to thereby form a polymer. In some embodiments, the antioxidant polymeric compound is a cross-linked polymer. In some embodiments, the antioxidant polymeric compound is provided in the form of a hydrogel.

In certain embodiments of the presently-disclosed antioxidant polymeric compounds, the monomeric portions included in the compounds comprise a diacrylate antioxidant or a multiacrylate antioxidant. In some embodiments, the acrylate molecules included in the antioxidant polymeric compounds are selected from acrylic acid and methacrylic acid.

In some embodiments of the presently-disclosed antioxidant polymeric compounds, the diamine molecules used to link the monomeric portions of the antioxidant polymeric compounds are selected from primary diamine molecules, secondary diamine molecules, or combinations thereof. In some embodiments, the diamine molecule is selected from the group consisting of 4,7,10-trioxa-1,13-tridecane diamine, 2,2' (ethylenedioxy)bis ethylamine, hexamethyldiamine, piperazine, spermine, spermidine, cadaverine, putrescine, and combinations thereof.

With regard to the antioxidants included in the presently-disclosed antioxidant polymeric compounds, by making use of the synthesis methods described herein, a number of antioxidant molecules can be incorporated into the antioxidant polymeric compounds. In some embodiments, the antioxidant molecule interposed between the two acrylate molecules is a phenolic antioxidant. In some embodiments, the antioxidant molecule is selected from 6-hydroxy-2,5,7,8-tetramethylchroman-2-carboxylic acid, tocopherol, (−)-epicatechin, acacetin, apigenin, azaleatin, baicalein, caffeic acid, catechin, chlorogenic acid, chrysin, cichoric acid, a curcuminoid, cyanidin, daidzein, delphinidin, diosmin, ellagic acid, epicatechin, epigallocatechin gallate, eriodictyol, eugenol, eupatorin, galangin, gallic acid, genistein, glycitein, hesperetin, isorhamnetin, kaempferol, luteolin, luteolin, malvidin, matairesinol, myricetin, naringenin, oroxylin A, pelargonidin, peonidin, petunidin, pinoresinol, quercetin, resorcinol, resveratrol, rosmarinic acid, rutin hydrate, silibinin, taxifolin, theaflavin, and analogs thereof. In some embodiments, the curcuminoid is curcumin.

In some embodiments of the presently-disclosed antioxidant polymeric compounds, the degradation rate of the compounds is tuned to thereby provide for the release of a desired amount of an antioxidant over a particular time period and/or for a particular application. In some embodiments, the tuning of the degradation rate is accomplished by, inter alia: adjusting the hydrophilicity, charge, or pendant structure of the compound; adjusting the amounts and types of acrylate molecules, antioxidant molecules, and diamine molecules in the compound; and adjusting the molar ratio of total acrylate reactive groups to total amine reactive groups in the compound. For example, in certain embodiments, to control the degradation rate of the antioxidant polymeric compounds, the molar ratio of acrylate reactive groups to amine reactive groups in the compound is about 0.25 to about 1.65 (e.g., about 1.2). As another example, in some embodiments, the compound comprises one or more unreacted amine groups or further comprises one or more additional diacrylate molecules linked to the diamine molecule to thereby control the degradation rate of the compound. In some embodiments, the one or more additional diacrylate molecules included in the antioxidant polymeric compounds are selected from poly(ethylene glycol) diacrylate, diethylene glycol diacrylate, 1,3-butanediol diacrylate, and combinations thereof. In some embodiments, the ratio of the monomeric portion to the one or more additional diacrylate molecules is about 0 percent to about 20 percent to thereby provide a compound with a controlled degradation rate.

Further provided, in some embodiments of the presently-disclosed subject matter, are methods for synthesizing a polymeric compound. In some embodiments, a method for synthesizing a polymeric compound is provided that includes combining an amount of diacrylate molecules with an amount of diamine molecules in a solution, and heating the solution such that the diacrylate molecules react with the diamine molecules to thereby form a linear, branched, hyperbranched, or cross-linked polymer. In some embodiments, the method further comprises the step of combining an amount of a monomeric portion with the diacrylate molecules and the diamine molecules, where each monomeric portion includes an antioxidant molecule interposed between at least two acrylate groups such that the synthesis method thereby forms an antioxidant polymeric compound of the presently-disclosed subject matter. In some embodiments of the synthesis methods, heating the solution to form the polymeric compounds comprises heating the solution to a temperature of about 40° C. to about 85° C. In some embodiments, a cross-linked polymer produced by the above-described synthesis methods is provided.

Still further provided, in some embodiments of the presently-disclosed subject matter, are methods of reducing oxidative stress. In some embodiments, a method of reducing oxidative stress is provided that comprises administering to a subject in need thereof an effective amount of an antioxidant polymeric compound of the presently-disclosed subject matter. In some embodiments, administering the compound to the subject reduces an amount of reactive oxygen species, reactive nitrogen species, or both that are present within a subject. In some embodiments, administering the compound to the subject comprises applying the polymeric compound to a tissue or organ of a subject. In other embodiments, the antioxidant polymeric compounds can be used to manufacture or coat objects, such as medical devices and/or other polymeric biomaterials, that are then placed on or within a subject. In further embodiments, the antioxidant polymeric compounds administered to the subject are configured to degrade within the subject over a time period of about 3 hours to about 5 hours to thereby provide a sustained release of the antioxidant molecules included within the antioxidant polymeric compounds.

Further advantages of the presently-disclosed subject matter will become evident to those of ordinary skill in the art after a study of the description, figures, and non-limiting Examples in this document.

DESCRIPTION OF THE DRAWINGS

FIG. 3A), tetrahydrofuran (THF; FIG. 3B), dichloromethane (DCM; FIG. 3C), and ethyl acetate (EtOAc; FIG. 3D), where the image in FIG. 3E shows polymeric compounds comprised of PEG400DA-TTD with a molar ratio of total acrylate to amine reactive groups (RTAA) of 0.6, either as a dry gel (1) or as swollen gels in different solvents, including DMSO (2), THF (3), DCM (4), and EtOAc (5);

FIGS. 14C and 14D are graphs of the data in FIGS. 14A and 14B re-plotted with respect to the theoretical antioxidant content of the degradation products;

FIGS. 16C and 16D are graphs of the data in FIGS. 16A and 16B re-plotted with respect to the theoretical antioxidant content of the degradation products;

DESCRIPTION OF EXEMPLARY EMBODIMENTS

Figure 1:
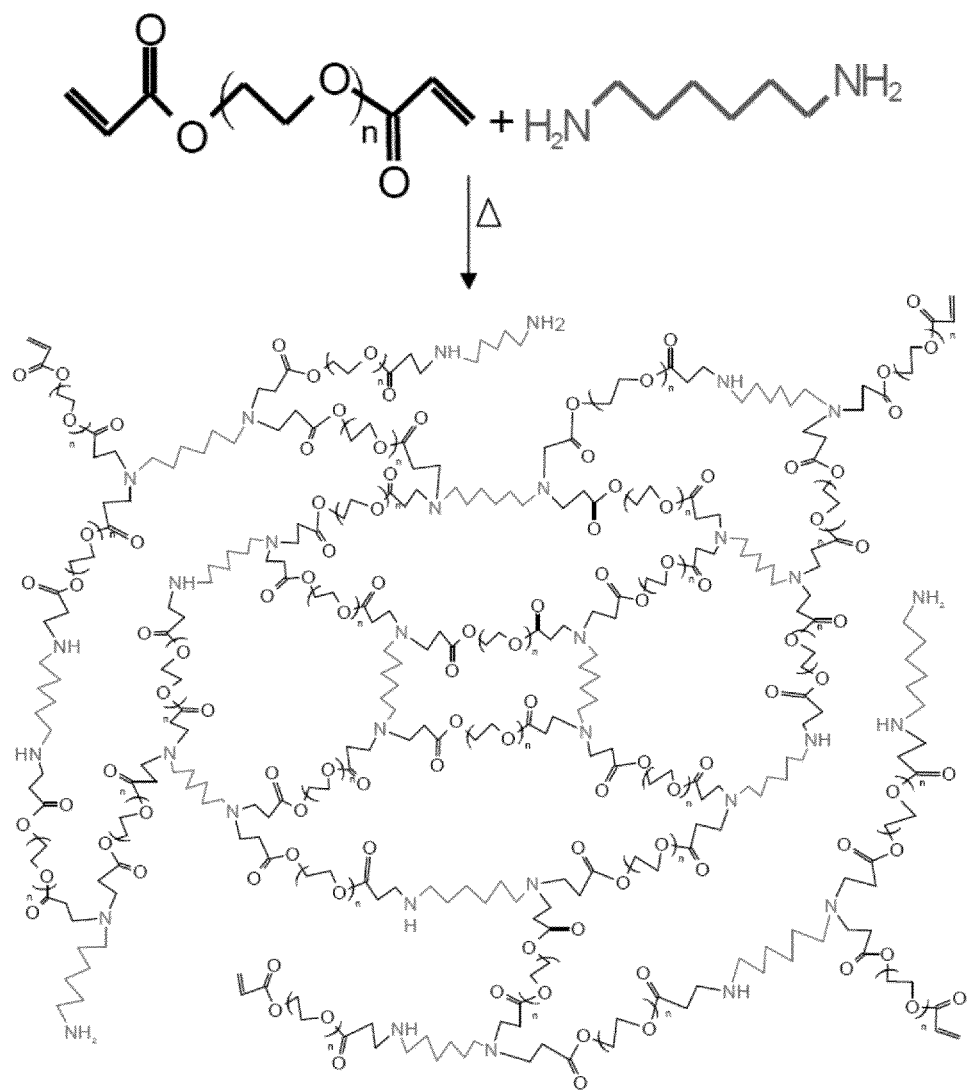
FIG. 1 is a schematic diagram showing hydrogel formation with poly(ethylene glycol) 400 diacrylate (PEG400DA) and hexamethylenediamine (HMD) in accordance with the presently-disclosed subject matter.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding, and no unnecessary limitations are to be understood therefrom.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although many methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a polymer" includes a plurality of such polymers, and so forth.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations in some embodiments of ±20%, in some embodiments of ±10%, in some embodiments of ±5%, in some embodiments of ±1%, in some embodiments of ±0.5%, and in some embodiments of ±0.1% from the specified amount, as such variations are appropriate to perform the disclosed method. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Oxidative stress is a pathophysiological response that is generally characterized by an imbalance between the rate of generation of oxidizing molecules (i.e., oxidants) and the capability or capacity of the antioxidant defense mechanisms of the cells and tissues of a subject. As a result of this imbalance, reactive oxygen species (ROS; e.g., superoxide anions, hydroxyl radicals, hydrogen peroxide, and numerous others) and reactive nitrogen species (RNS; e.g., peroxynitrite) are generated in excess. These ROS and RNS subsequently react with cellular membranes, proteins, DNA, and other cellular components such that the ROS and RNS impair the normal functioning of the cells and tissues of the subject. In this regard, the attenuation of cellular oxidative stress, which plays a role in biomaterial-induced inflammatory responses, is thought to potentially provide a means to control host tissue responses to biomaterials, such as biodegradable polymers, and many biodegradable polymers have thus been synthesized to date that conjugate or coat polymers with antioxidant molecules in an attempt to use the antioxidant-containing polymers as a means to attenuate oxidative stress. Nevertheless, while those previous antioxidant-containing polymers have reduced the incidence of oxidative stress in some instances, the functionality of those prior antioxidant-containing polymers has been limited by the fact that those prior compounds provided little or no control over the degradation of the polymers and the types and amounts of antioxidants that could be incorporated into the polymeric structures. To that end, the presently-disclosed subject matter is based, at least in part, on the discovery that a modified non-free-radical polymerization technique, which makes use of poly(β-amino ester) (PβAE) chemistry, can be used to provide a platform to synthesize cross-linked networks of poly (antioxidant β-amino ester) (PAβAE) polymers with various amounts and types of antioxidant molecules and various degradation properties, such that the antioxidant polymeric compounds disclosed herein can effectively be used to reduce an amount of oxidative stress in a subject.

In some embodiments, the presently-disclosed subject matter thus includes antioxidant polymeric compounds and methods for reducing oxidative stress, wherein biodegradable, antioxidant polymeric compounds are configured to degrade over a time period and provide a sustained release of an antioxidant molecule. In some embodiments of the presently-disclosed subject matter, an antioxidant polymeric compound is provided that comprises a plurality of monomeric portions, where each monomeric portion includes an antioxidant molecule interposed between at least two acrylate molecules, and where at least one acrylate molecule of each monomeric portion is linked by a diamine molecule to an acrylate molecule of an adjacent monomeric portion to thereby form a polymer.

The term "monomeric portion", as used herein in reference to a portion of the presently-disclosed antioxdiant polymeric compounds is used to refer to a distinct unit or portion of the polymeric compound that comprises an antioxidant molecule interposed between at least two acrylate molecules, and that can then bond to other molecules via the acrylate molecules to thereby form an antioxidant polymeric compound of the presently-disclosed subject matter. In this regard, it is noted that the acrylate groups may act as functional groups that react and bond with other molecules, such that the monomeric portions can also be referred to as functionalized antioxidants. It is further noted that the monomeric portions can, in some embodiments, be comprised of an antioxidant molecule interposed between a first acrylate molecule connected to one portion of the antioxidant molecule and a second acrylate molecule connected to a second portion of the antioxidant molecule to thereby create an diacrylate antioxidant or, in other words, a monomeric portion that includes two acrylate molecules. For example, in some embodiments, a monomeric portion is provided that is of the general formula (I) shown below, where "A" indicates an antioxidant molecule:

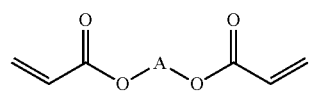

(I)

In other embodiments, a monomeric portion can be provided that is comprised of an antioxidant molecule interposed between a first acrylate molecule that is connected to one portion of the antioxidant molecule, a second acrylate molecule that is connected to a second portion of the antioxidant molecule, and a third acrylate molecule that is connected to a third portion of the antioxidant molecule to thereby create a multiacrylate antioxidant or, in other words, a monomeric portion that includes three or, in some embodiments, more than three acrylate molecules connected to the antioxidant molecules. For example, in some embodiments a monomeric portion is provided that is of the general formula (II) shown below, where "A" again indicates an antioxidant molecule:

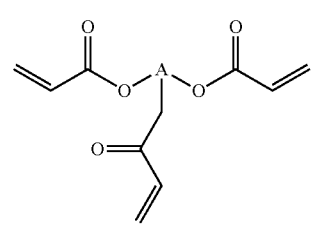

(II)

As indicated in the exemplary formulas of the diacrylate and multiacrylate antioxidants provided above, the term "acrylic acid" or "acrylate" refers to chemical moieties having the formula:

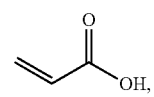

but which can be modified to include various groups including, but not limited to, methyl groups and salts. As such, the term "acrylic acid" or "acrylate" is further inclusive of methacrylic acid and acrylic acid salts (e.g., acryloyl chloride groups) which can be attached to an antioxidant molecule and then utilized as part of a monomeric portion of the presently-disclosed compounds. In some embodiments of the presently-disclosed subject matter, the acrylate molecules included in the monomeric portions of the antioxidant polymeric compounds are selected from the group consisting of acrylic acid and methacrylic acid.

Regardless of the type of acrylate molecule used, however, and as noted above, each monomeric portion includes an antioxidant molecule that is interposed between the at least two acrylate molecules. The terms "antioxidant" or "antioxidant molecule" are used herein to refer to molecules having the ability to decrease or inhibit the oxidation of other molecules and "reduce" oxidative stress, as defined herein below. As is appreciated in the art, such a decrease or inhibition can occur by the antioxidant molecule being oxidized itself and removing or otherwise inhibiting free radical intermediates (e.g., reactive oxygen species or reactive nitrogen species), such that the antioxidants act as reducing agents and reduce the extent to which other surrounding molecules are oxidized.

Figure 12:
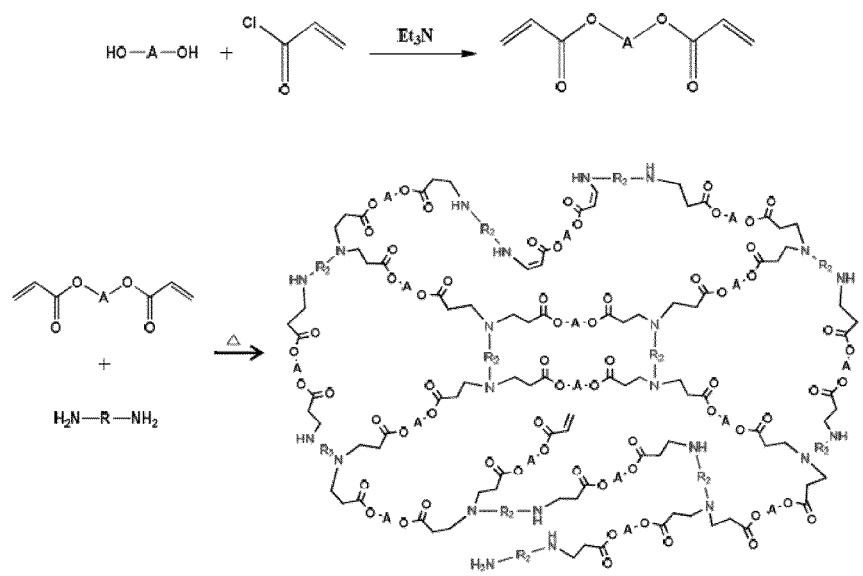
FIG. 12 includes schematic diagrams showing an exemplary synthesis of an antioxidant polyermic compound of the presently-disclosed subject matter, including a diagram showing the synthesis of a monomeric portion comprised of an antioxidant molecule interposed between two acrylate molecules, and further including a diagram showing the reaction of the monomeric portion with a diamine to form a cross-linked multiacrylate and poly(antioxidant β-amino esters) (PAβAE) hydrogel.

The term "interposed", as used herein in reference to antioxidant molecules that are interposed between at least two acrylate molecules, refers to the orientation or positioning of the antioxidant molecules between the at least two acrylate molecules of the presently-disclosed monomeric portions. As would be recognized by those of ordinary skill in the art, such an orientation or positioning of an antioxidant molecule between at least two acrylate molecules can be accomplished by a variety of chemical and/or electrostatic bonds and will depend on the particular antioxidant molecule chosen for a particular polymeric compound or application. In some embodiments, an acid or alcohol spacer molecule having a variable length (e.g., lactone substitution, caprolactone) can be utilized, which would, upon degradation release a protected antioxidant that would then be hydrolytically or enzymatically cleaved. In some embodiments, however, and as also indicated in the exemplary formulas of the diacrylate and multiacrylate antioxidants provided above, the acrylate molecules of each monomeric portion are linked to the antioxidant molecules by an ester linkage that is formed via the reaction of a hydroxyl (—OH) group on the antioxidant molecule with a reactive group on an acrylate molecule. For example, as shown in FIG. 12, in some embodiments, an antioxidant having two hydroxyl groups can be reacted with an acryloyl chloride molecule to produce a monomeric portion where the antioxidant molecule is interposed between the two acrylate molecules via two ester linkages.

In some embodiments of the presently-disclosed compounds, which include an antioxidant molecule interposed between at least two acrylate molecules via ester linkages, the antioxidant molecule is a phenolic antioxidant. The term "phenolic antioxidant" is used herein to refer to antioxidants molecules that include at least one phenol group having the general formula:

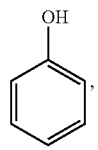

but which can further be attached to various other groups including, but not limited to, additional hydroxyl groups, additional ring structures, and/or various alkyl groups. It is further noted that more than one phenol group can be included in a particular antioxidant molecule such that, in some embodiments, the term "phenolic antioxidant" can be used interchangeably with the term "polyphenolic antioxidant" to describe an antioxidant molecule having multiple phenol groups. In some embodiments, and as would be recognized by those of ordinary skill in the art, including an antioxidant molecule having multiple phenol groups in a monomeric portion of the presently-disclosed subject matter allows the antioxidant to be interposed between the at least two acrylate groups in a variety of configurations. Additionally, and as noted above, in some embodiments, the inclusion of an antioxidant molecule having multiple phenol groups allows for the formation of multiacrylate antioxidants. In some embodiments, the phenolic antioxidant is selected from 6-hydroxy-2,5,7,8-tetramethylchroman-2-carboxylic acid, tocopherol, (−)-epicatechin, acacetin, apigenin, azaleatin, baicalein, caffeic acid, catechin, chlorogenic acid, chrysin, cichoric acid, a curcuminoid, cyanidin, daidzein, delphinidin, diosmin, ellagic acid, epicatechin, epigallocatechin gallate, eriodictyol, eugenol, eupatorin, galangin, gallic acid, genistein, glycitein, hesperetin, isorhamnetin, kaempferol, luteolin, luteolin, malvidin, matairesinol, myricetin, naringenin, oroxylin A, pelargonidin, peonidin, petunidin, pinoresinol, quercetin, resorcinol, resveratrol, rosmarinic acid, rutin hydrate, silibinin, taxifolin, theaflavin, and analogs thereof. Exemplary structures of certain of the phenolic antioxidants used in accordance the presently-disclosed subject matter are provided in Table 1 below:

TABLE 1

Exemplary Phenolic Antioxidant Compounds.

| Antioxidant | Structure |
|---|---|
| Quercetin | 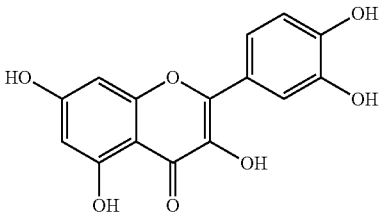 [SMILES: O=c1c(O)c(-c2ccc(O)c(O)c2)oc2cc(O)cc(O)c12] |
| Taxifolin | 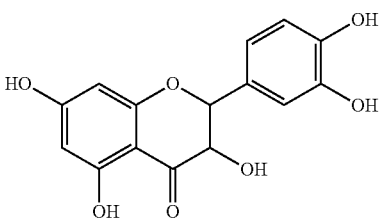 [SMILES: O=C1c2c(O)cc(O)cc2OC(c2ccc(O)c(O)c2)C1O] |
| Rutin hydrate | 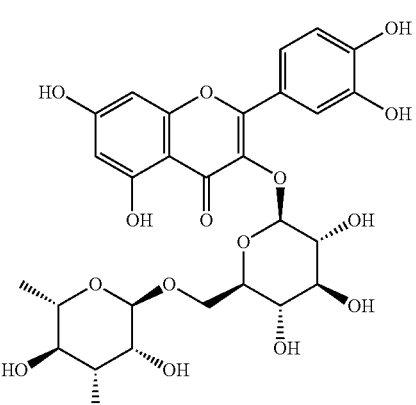 |
| (−)-Epicatechin | 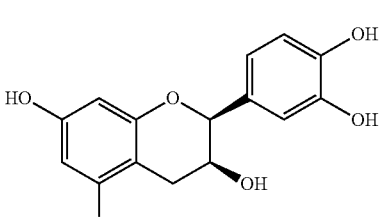 |
| Resorcinol (Antiseptic/ Disinfectant) | 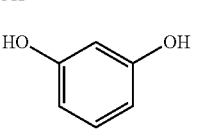 |

TABLE 1-continued
Exemplary Phenolic Antioxidant Compounds.
| Antioxidant | Structure |
|---|---|
| Eugenol | 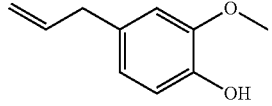 |
| Curcuminoids | 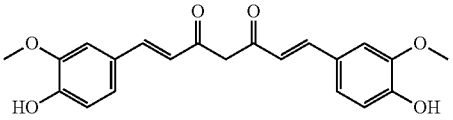 |
| Chrysin | 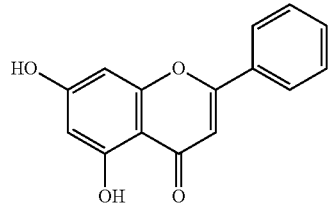 [SMILES: O=c1cc(-c2ccccc2)oc2cc(O)cc(O)c12] |
| Baicalein | 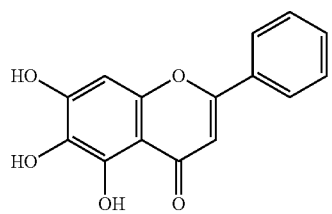 [SMILES: O=c1cc(-c2ccccc2)oc2cc(O)c(O)c(O)c12] |
| Azaleatin | 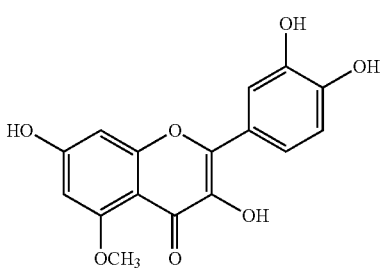 [SMILES: COc1cc(O)cc2oc(-c3ccc(O)c(O)c3)c(O)c(=O)c12] |
| Kaempferol | 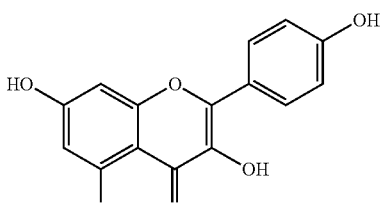 |
| Isorhamnetin | 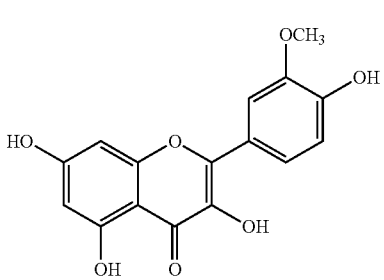 [SMILES: COc1cc(-c2oc3cc(O)cc(O)c3c(=O)c2O)ccc1O] |
| Myricetin | 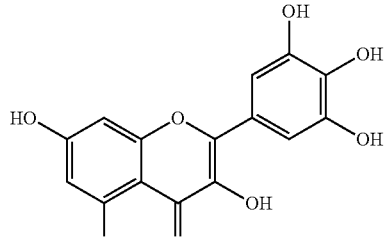 |
| Apigenin | 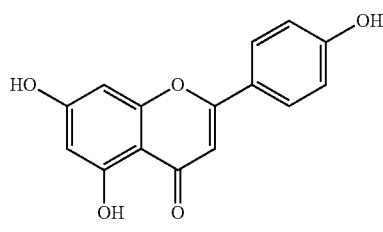 [SMILES: O=c1cc(-c2ccc(O)cc2)oc2cc(O)cc(O)c12] |
| Resveratrol | 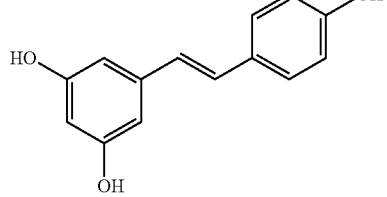 |
| Luteolin | 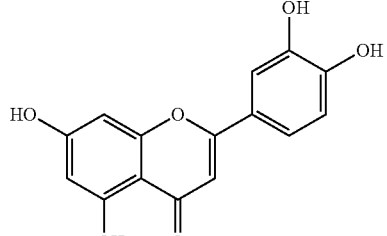 |
| Daidzein | 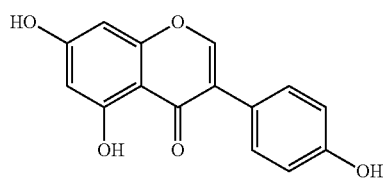 [SMILES: O=c1c(-c2ccc(O)cc2)coc2cc(O)cc(O)c12] |
| Glycitein | 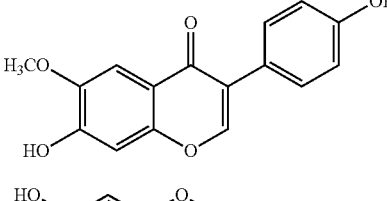 |
| Genistein | 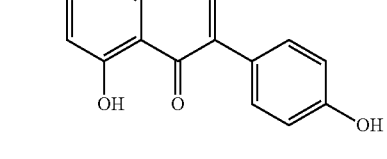 |

TABLE 1-continued

Exemplary Phenolic Antioxidant Compounds.

| Antioxidant | Structure |
|---|---|
| Eriodictyol | |
| Naringenin | |
| Hesperetin | |
| Epigallocatechin gallate | |
| Epicatechin gallate | |
| Silibinin | |
| Ellagic acid | |
| Gallic acid | |
| Caffeic acid | |
| Chlorogenic acid | |
| Matairesinol | |
| Pinoresinol | |

As noted, in some embodiments of the presently-disclosed subject matter, the acrylate molecules of each monomeric portion are linked to the antioxidant molecules by an ester linkage that is formed via the reaction of a hydroxyl (—OH) group on the antioxidant molecule with a reactive group on an acrylate molecule. For example, in some embodiments, a monomeric comprising a quercetin tetra-acrylate molecule is provided as shown in the following general formula (III):

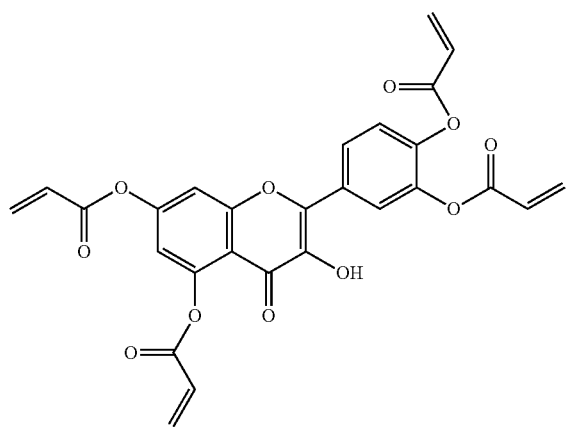

(III)

As another example of acrylate molecules linked to an antioxidant molecule by an ester linkage to form a monomeric portion of the presently-disclosed compounds, in some embodiments, a curcumin diacrylate molecule is provided as shown in the following general formula (IV):

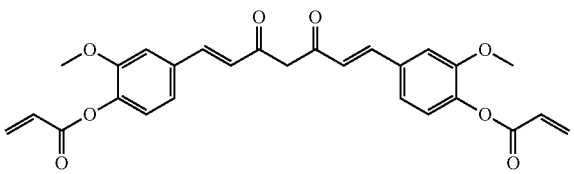

(IV)

As noted above, each monomeric portion is linked by a diamine molecule to an acrylate molecule of an adjacent monomeric portion to thereby form the antioxidant polymers of the presently-disclosed subject matter. The terms "diamine" and "diamine molecule," are used interchangeably herein to refer to molecules that comprise at least two amines and that can be used to link together two monomeric portions of the presently-disclosed compounds. In embodiments where the diamine molecule comprises more than two amines, the term "diamine" can be used interchangeably with the term "multiamine." The term "amine" is used herein to refer to a functional group including a nitrogen atom with three single bonds to either hydrogen atoms or alkyl groups, with at least one alkyl group being required. Amines include primary amines, secondary amines, and tertiary amines. A primary amine is defined as a nitrogen atom bonded to two hydrogen atoms and one alkyl group (R—NH$_2$). A secondary amine is defined as a nitrogen atom bonded to one hydrogen atom and two alkyl groups (R—NH—R). A tertiary amine is defined as a nitrogen atom bonded to three alkyl groups (R$_3$N). In some embodiments, the diamine molecules included in compounds of the presently-disclosed subject matter are "primary diamine molecules", which comprise primary amines, or "secondary diamine molecules", which comprise secondary amines. In some embodiments, the diamine molecules are selected from the group consisting of 4,7,10-trioxa-1,13-tridecane diamine(TTD), 2,2' (ethylenedioxy) bis ethylamine (EDBE), and hexamethyldiamine (HMD), as well as biologically-derived diamines and multiamines including, but not limited to, piperazine, spermine, spermidine, cadaverine, putrescine, and combinations of the foregoing, as shown in the general formulas below.

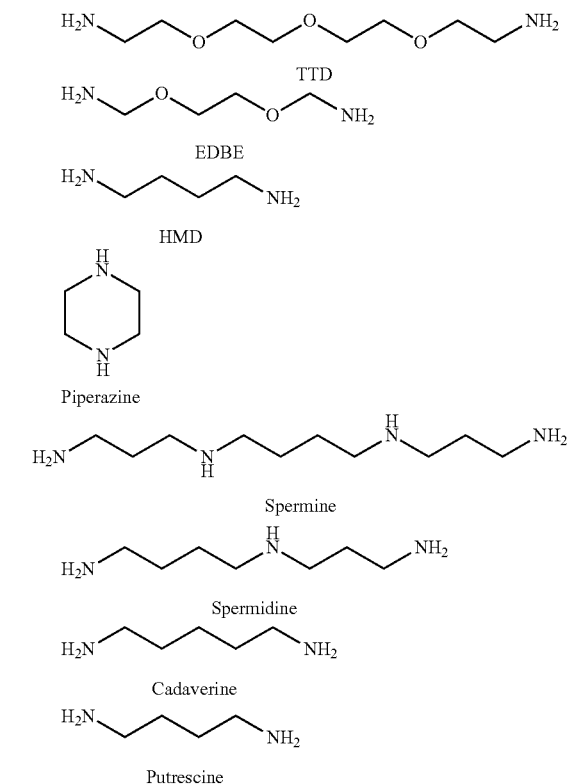

With further regard to the amine molecules used in accordance with the presently-disclosed subject matter, in some embodiments, an antioxidant polymeric compound can be produced without the use of a diamine molecule. In some embodiments, a primary amine molecule, which is capable of attaching to two acrylate molecules of two separate monomeric portions can be advantageously utilized to produce an antioxidant polymeric composition of the presently-disclosed subject matter. In this regard, in some embodiments, the primary amine molecules can be selected from the group consisting of isobutyl amine or n-butylmethylamine.

Figure 19:
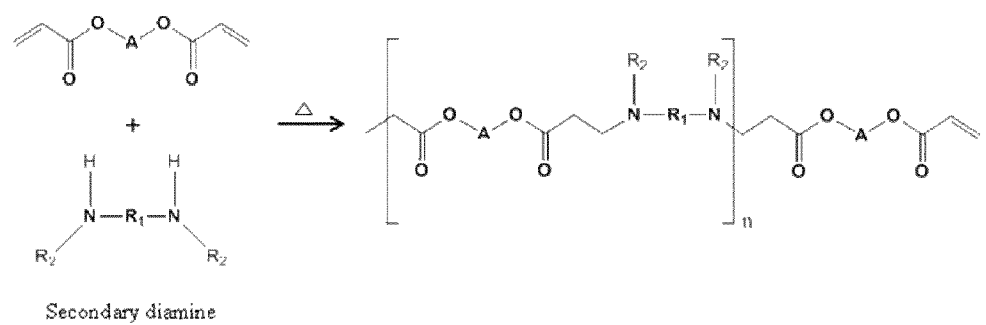
FIG. 19 is a schematic diagram showing an exemplary synthesis of an antioxidant polyermic compound of the presently-disclosed subject matter, and showing the reaction of the monomeric portion with a secondary diamine to form a linear polymer.

As shown in FIG. 19, in some embodiments of the presently-disclosed subject matter, an antioxidant polymeric compound can be synthesized where the polymer is in a linear configuration such that the polymer is not branched. Due to the inclusion of primary, secondary, or tertiary diamine molecules in an antioxidant polymeric compound of the presently-disclosed subject matter, however, in some embodiments, an antioxidant polymeric compound is provided that is cross-linked. The term "cross-linked," is used herein to refer to a polymer that does not have a linear configuration, where monomers are only bonded to adjacent monomers along a single polymer chain, but instead has a configuration where the polymer chains are linked to one another by chemical bonds (e.g., covalent or ionic bonds), either between different polymer chains or different parts of the same polymer chain. For example, in some embodiments of the presently-disclosed subject matter, and as shown in FIG. 12, a primary diamine molecule (e.g., $H_2N$—R—$NH_2$) is included in the antioxidant polymeric compound and is tetrafunctional such that each amine within the primary diamine molecule can bond with up to two acrylate molecules included in monomeric portions of the polymer to thereby create a cross-linked polymer. Of course, and as also shown in FIG. 12, each amine of a diamine molecule of the presently-disclosed subject matter need not be bonded in every case to two acrylate molecules, but can instead, in some embodiments, include unreacted amine molecules that are linked to only one acrylate group of a monomeric portion or that include a bond to one or more hydrogen atoms in place of bonds to acrylate groups, as also shown in FIG. 12. In some embodiments, the amounts of unreacted amine molecules included in an antioxidant polymeric compound can be varied and can be configured for a particular application by varying the amounts of diacrylates and diamine molecules that are combined together to produce an antioxidant polymeric compound of the presently-disclosed subject matter.

As noted above, the presently-disclosed closed subject matter is based, at least in part, on the discovery that poly(β-amino ester) (PβAE) chemistry can effectively be used as a platform to synthesize cross-linked networks of poly (antioxidant β-amino ester) (PAβAE) polymers with tunable properties, which may then advantageously be used to provide for the release of a desired amount of an antioxidant molecule for a particular application. In this regard, in some embodiments of the presently-disclosed compounds, the degradation rate of the antioxidant polymeric compounds, or, in other words, the rate at which the compounds are broken down into smaller components to allow for the release of the antioxidants, can be controlled by selecting the types and amounts of acrylate, antioxidant, and/or diamine molecules in a particular polymeric antioxidant compound of the presently-disclosed subject matter. For example, in some embodiments, a monomeric portion can be combined with either TTD, EDBE, or HMD as it has been observed that antioxidant polymeric compounds comprised of TTD diamine molecules are capable of degrading at a faster rate than compounds including EDBE or HMD diamine molecules. As another example, in some embodiments, one or more additional diacrylate molecules can be incorporated into an antioxidant polymeric compound, as described in further detail below, as it has been observed that compounds making use of certain diacrylates (e.g., diethylene glycol diacrylate) are capable of degrading at a faster rate than compounds making use of other diacrylate molecules (e.g., poly(ethylene glycol) 400 diacrylate).

In some embodiments of the presently-disclosed subject matter, the degradation rate of the polymeric compositions is varied by varying the percentage of hydrophobic antioxidant molecules included in a particular antioxidant polymeric compound. Without wishing to be bound by any particular theory, it is believed that by including hydrophobic antioxidants within a polymeric compound of the presently-disclosed subject matter, an increased percentage of hydrophobic antioxidants in the compounds provides for a decrease in the hydrophilicity of the polymeric compounds and a concurrent decrease in the degradation rates.

In some embodiments of the presently-disclosed subject matter, the degradation rate of the polymer can be varied by varying the ratio of total acrylate molecules to total amines within the compounds. The phrases "molar ratio of acrylate reactive groups to amine reactive groups", "ratio of acrylate to amine reactive groups", and "RTAA", are used herein to refer to the ratio of the acrylate reactive groups to amine reactive groups in a mixture that reacts to form an antioxidant polymeric compound of the presently-disclosed subject matter. For instance, a diacrylate has two acrylate reactive groups and a diamine has two amine reactive groups. Thus, a compound comprising one diacrylate and one diamine has a RTAA of 1:1.

Without wishing to be bound by any particular theory, it is believed that unreacted amines within a polymeric antioxidant compound of the presently-disclosed subject matter accelerate the rate at which the polymeric antioxidant compounds degrade by autocatalyzing the degradation of the polymer. As such, in some embodiments, an antioxidant polymeric compound can be provided having a higher molar ratio of acrylate reactive groups to amine reactive groups such that the polymer is one that degrades at a slower rate due to the presence of fewer unreacted amines remaining in the antioxidant polymeric compound. In some embodiments, the molar ratio of acrylate reactive groups to amine reactive groups is about 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 2.00, 3.05, 3.10, 3.15, 3.20, 3.25, or 3.30. In some embodiments, the molar ratio of acrylate reactive groups to amine reactive groups in the antioxidant polymeric compound is about 0.25 to about 1.65. In some embodiments, the molar ratio of acrylate reactive groups to amine reactive groups is about 1.2.

As described herein above, in some embodiments, the degradation rate of the compounds of the presently-disclosed subject matter can also be increased by including one or more additional diacrylate molecules, which are not associated with an antioxidant molecule, in the presently-disclosed compounds such that the one or more additional diacrylate molecules are substituted for the hydrophobic antioxidant-containing monomeric portions and are linked to the diamine molecules of the presently-disclosed antioxidant polymeric compounds. In this regard, in some embodiments, the ratio of monomeric portions to the one or more additional diacrylate molecules is about 0 percent, about 5 percent, about 10 percent, about 15 percent, about 20 percent, about 25 percent, about 30 percent, about 35 percent, about 40 percent, about 45 percent, about 50 percent, about 55 percent, about 60 percent, about 65 percent, about 70 percent, about 75 percent, about 80 percent, about 85 percent, about 90 percent, about 95 percent, about 100 percent. In some embodiments, the ratio of monomeric portions to the one or more additional diacrylate molecules is about 0 percent to about 20 percent. In some embodiments, the one or more additional diacrylate molecules included in the antioxidant polymeric compounds are selected from poly(ethylene glycol) diacrylate, diethylene glycol diacrylate, 1,3-butanediol diacrylate, and combinations thereof. Further, in some embodiments, which make use of poly(ethylene glycol) diacrylate as a diacrylate molecule to control the degradation rate of the compounds, a poly(ethylene glycol) diacrylate molecule having a particular molecular weight can be selected for a particular application such that molecular weight of the poly(ethylene glycol) diacrylate molecule can be used as a tunable parameter to control the degradation of the antioxidant polymeric compound.

Further provided, in some embodiments of the presently-disclosed subject matter, are methods for synthesizing a compound. In the synthesis of PβAE hydrogels, traditional two-step synthesis methods are limited by oxygen inhibition of free radical polymerization and by the use of free radical initiators/accelerators that can cause toxicity to in situ polymerization. Furthermore, free radical polymerization in the presence of certain antioxidants generally does not result in cross-linked polymers, due to the free radical inhibiting effects of those antioxidants. It has been determined, however, that by making use of a Michael-type addition reaction between a di- or multiacrylate molecule and a diamine molecule, a method for synthesizing a polymeric compound can be provided that does not involve free radical polymerization, but yet is a capable of producing a polymeric compound with tunable properties.

In some embodiments, a method for synthesizing a polymeric compound is provided that includes combining an amount of diacrylate molecules with an amount of diamine molecules in a solution; and heating the solution such that the diacrylate molecules react with the amine molecules to thereby form a polymer. As the reaction of the acrylate antioxidants with amines can occur rapidly and spontaneously, in some embodiments, heating the solution comprises heating the solution to a temperature of about 20° C., about 25° C., about 30° C., about 35° C., about 40° C., about 45° C., about 50° C., about 55° C., about 60° C., about 65° C., about 70° C., about 75° C., about 80° C., about 85° C., or about 90° C. In some embodiments, heating the solution comprises heating the solution to a temperature of about 40° C. to a temperature of about 85° C. In some embodiments, the reaction is performed at a temperature of about −20° C. to about 85° C. Of course, to produce the solution of diacrylate molecules and diamine molecules, any suitable solvent can be used and can be selected for a particular synthesis procedure as would be recognized by those of ordinary skill in the art.

In some embodiments of the presently-disclosed methods for synthesizing a polymeric compound, an antioxidant polymer compound of the presently-disclosed subject matter is synthesized by further combining an amount of diacrylate molecules with an amount of diamine molecules in a solution and adding an amount of a monomeric portion of the presently-disclosed subject matter, where the monomeric portion includes an antioxidant molecule interposed between two acrylate molecules, as described above. In this regard, and as also described above, the synthesis procedures can, of course, be readily adapted to produce a particular antioxidant polymeric compound having a desired amount of antioxidant or a desired degradation rate by controlling the amounts and types of the diacrylate molecules, acrylate molecules, antioxidant molecules, and diamine molecules that are combined together in the solution. In some embodiments, a cross-linked antioxidant polymer is produced by the above-described methods.

Still further provided, in some embodiments of the presently-disclosed subject matter, are methods of reducing oxidative stress. In some embodiments, a method of reducing oxidative stress in a subject is provided that includes administering to a subject in need thereof an effective amount of an antioxidant polymeric compound of the presently-disclosed subject matter that comprises a plurality of monomeric portions, where each monomeric portion includes an antioxdiant molecule interposed between two acrylate molecules, and where at least one acrylate molecule of each monomeric portion is linked by a diamine molecule to an acrylate molecule of an adjacent monomeric portion.

As used herein in reference to oxidative stress, the terms "reduction" and "reducing" relate to any decrease in the oxidative stress that occurs as a result of an imbalance between the rate of generation of oxidizing molecules (i.e., oxidants) and the capability or capacity of the antioxidant defense mechanisms of a subject. Such decreases in oxidative stress include, but are not limited to: any decreases in the amount of oxidizing molecules such as ROS and RNS; any decreases in the functional impairment of the cellular components (e.g., cellular membranes, DNA, etc.) of a subject that is caused by oxidative stress; and any decrease in the severity of the oxidative stress. It is understood that the degree of reduction need not be absolute (i.e., the degree of reduction need not be a complete prevention of the development of oxidative stress) and that intermediate levels of reductions in the occurrence of oxidative stress are contemplated by the presently-disclosed subject matter. As such, in some embodiments where the reduction can be assessed or estimated in numerical terms, the reduction in the occurrence of oxidative stress can be about 5%, about 10%, about 15%, about 20%, about 25%, about 30%, about 50%, about 75%, about 80%, about 85%, about 90%, about 95%, about 99%, or about 100%. In some embodiments, administering the antioxidant polymeric compounds of the presently-disclosed subject matter to a subject comprises reducing an amount of reactive oxygen species, an amount of reactive nitrogen species, or both in a subject.

For administration of an antioxidant polymeric compound as disclosed herein, in some embodiments, administering an effective amount of a compound comprises applying the antioxidant polymeric compound to a tissue or organ of a subject. In this regard, in some embodiments, the compounds of the presently-disclosed can be administered topically to the organs and tissues of a subject as part of a cream or ointment formulation wherein the compounds are provided as an active ingredient in a carrier such as a pharmaceutical cream base. As would be recognized by those of ordinary skill in the art, various formulations for topical use include drops, tinctures, lotions, creams, solutions, and ointments containing the active ingredient and various supports and vehicles.

In some embodiments of the presently-disclosed subject matter, administering an effective amount of an antioxidant polymeric compound of the presently-disclosed subject matter comprises administering the compounds as part of a biodegradable film that can be overlaid on a tissue or organ of a subject to thereby provide a means to reduce oxidative stress in that tissue or organ.

Various liquid and powder formulations can also be prepared by conventional methods for inhalation into the lungs of the subject to be treated. For example, the antioxidant polymeric compounds can be conveniently delivered in the form of an aerosol spray presentation from pressurized packs or a nebulizer, with the use of a suitable propellant, e.g., dichlorodifluoromethane, trichlorofluoromethane, dichlorotetrafluoroethane, carbon dioxide or other suitable gas. Capsules and cartridges of, for example, gelatin for use in an inhaler or insufflator may be formulated containing a powder mix of the desired compound and a suitable powder base such as lactose or starch.

In some embodiments of the presently-disclosed subject matter, the antioxidant polymeric compounds may be incorporated into a nanoparticle. A nanoparticle within the scope of the presently-disclosed subject matter is meant to include particles at the single molecule level as well as those aggregates of particles that exhibit microscopic properties. Methods of using and making a nanoparticle that incorporates a compound of interest are known to those of ordinary skill in the art and can be found following references: U.S. Pat. Nos. 6,395,253, 6,387,329, 6,383,500, 6,361,944, 6,350,515, 6,333,051, 6,323,989, 6,316,029, 6,312,731, 6,306,610, 6,288,040, 6,272,262, 6,268,222, 6,265,546, 6,262,129, 6,262,032, 6,248,724, 6,217,912, 6,217,901, 6,217,864, 6,214,560, 6,187,559, 6,180,415, 6,159,445, 6,149,868, 6,121,005, 6,086,881, 6,007,845, 6,002,817, 5,985,353, 5,981,467, 5,962,566, 5,925,564, 5,904,936, 5,856,435, 5,792,751, 5,789,375, 5,770,580, 5,756,264, 5,705,585, 5,702,727, and 5,686,113, each of which is incorporated herein by this reference.

In some embodiments of the presently-disclosed subject matter, the antioxidant polymeric compounds can also be formulated as microspheres or directly added into creams, ointments, and consumer products (e.g., shampoos, soaps, gels, viscous liquids, etc.). Each of these formulations, and the formulations described herein above, can be used in pulmonary delivery vehicles (dry powder inhalers, aerosols, multidose inhalers), buccal delivery systems (rapid release films, mucoadhesive films/patches), and/or as oral pharmaceutical excipients.

In further embodiments of the presently-disclosed methods for reducing oxidative stress, the antioxidant polymeric compounds can be utilized as part of a method for reducing the oxidative stress that is commonly associated with the insertion or implantation of medical devices or certain polymeric biomaterials in a subject. In some embodiments, a method for reducing oxidative stress is provided wherein the antioxidant polymeric compounds of the presently-disclosed subject matter are used to construct a medical device or polymeric biomaterial, and/or are used to coat a medical device or polymeric biomaterial and thereby reduce oxidative stress as defined herein. It will be understood by those skilled in the art that the terms "coated" or "coating," as used herein, means to apply the antioxidant polymeric compounds to a surface of the device or polymeric biomaterial, preferably an outer surface that would be exposed to the cells, tissues, and organs of a subject. Of course, the surface of the device or polymeric biomaterial need not be entirely covered by the antioxidant polymeric compounds.

Medical devices or polymeric biomaterials to be coated with the antioxidant polymeric compounds described herein include, but are not limited to, staples, sutures, replacement heart valves, cardiac assist devices, hard and soft contact lenses, intraocular lens implants (anterior chamber, posterior chamber or phakic), other implants such as corneal inlays, kerato-prostheses, vascular stents, epikeratophalia devices, glaucoma shunts, retinal staples, scleral buckles, dental prostheses, thyroplastic devices, laryngoplastic devices, vascular grafts, soft and hard tissue prostheses including, but not limited to, pumps, electrical devices including stimulators and recorders, auditory prostheses, pacemakers, artificial larynx, dental implants, mammary implants, penile implants, cranio/facial tendons, artificial joints, tendons, ligaments, menisci, and disks, artificial bones, artificial organs including artificial pancreas, artificial hearts, artificial limbs, and heart valves, tissue-engineering scaffolds, stents, wires, guide wires, intravenous and central venous catheters, laser and balloon angioplasty devices, vascular and heart devices (tubes, catheters, balloons), ventricular assists, blood dialysis components, blood oxygenators, urethral/ureteral/urinary devices (Foley catheters, stents, tubes and balloons), airway catheters (endotracheal and tracheostomy tubes and cuffs), enteral feeding tubes (including nasogastric, intragastric and jejunal tubes), wound drainage tubes, tubes used to drain the body cavities such as the pleural, peritoneal, cranial, and pericardial cavities, blood bags, test tubes, blood collection tubes, vacutainers, syringes, needles, pipettes, pipette tips, and blood tubing.

Regardless of the route of administration, the antioxidant polymeric compounds of the presently-disclosed subject matter are typically administered in amount effective to achieve the desired response. The term "effective amount", as used herein, refers to an amount of the antioxidant polymeric compound sufficient to produce a measurable biological response (e.g., a reduction in oxidative stress). Actual dosage levels of the antioxidants in a compound of the presently-disclosed subject matter can be varied so as to administer an amount of antioxidant molecules that is effective to achieve the desired response for a particular subject and/or application. The selected dosage level will depend upon a variety of factors including the activity of the particular antioxidant molecule, formulation, the route of administration, combination with other drugs or treatments, severity of the condition being treated, and the physical condition and prior medical history of the subject being treated. Preferably, a minimal dose is administered, and dose is escalated in the absence of dose-limiting toxicity to a minimally effective amount. Determination and adjustment of a therapeutically effective dose, as well as evaluation of when and how to make such adjustments, are known to those of ordinary skill in the art of medicine.

In some embodiments of the presently-disclosed methods for reducing oxidative stress, the antioxidant polymeric compounds administered to a subject are configured to degrade within the subject over a predetermined period of time so as to provide a sustained release of the antioxidant molecule to the subject and, in some embodiments, provide for a sustained reduction in oxidative stress. As noted above, the degradation rate of the antioxidant polymeric compounds of the presently-disclosed subject matter can be controlled by selecting the types and amounts of acrylate, antioxidant, and/or diamine molecules in a particular polymeric antioxidant compound of the presently-disclosed subject matter. As such, in some embodiments of the presently-disclosed subject matter, specific types and amounts of acrylate, antioxidant, and/or diamine molecules can be selected and used to produce an antioxidant polymeric compound that will then degrade over a predetermined time period. For example, in some embodiments, an antioxidant polymeric compound comprised of about 5 percent by weight to about 20 percent by weight of a monomeric portion including quercetin- or curcumin-multiacrylate molecules can be administered to a subject to thereby provide an antioxidant polymeric compound that will degrade over about 3 to about 5 hours and provide for a sustained release of the antioxidant compounds over the about 3 to about 5 hour time period.

In some embodiments, the antioxidant polymeric compounds of the presently-disclosed subject matter can be synthesized such that the compounds degrade in about 40 minutes to about 100 days. In some embodiments, the compounds degrade in about 40, 50, 60, 70, 80, 90, 100, 120, 140, 160, 180, 200, 220, 240, 260, 280, 300, 320, 340, or 360 minutes. In other embodiments, the compounds degrade in about 6, 7, 8, 9, 10, 12, 14, 16, 18, 20, 22, 24, 26, 28, 30, 32, 34, 36, 38, 40, 42, 44, 46, or 48 hours. In yet further embodiments, the compounds degrade in about 2, 2.5, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90, 95, or 100 days to thereby provide a sustained release of the antioxidant such that oxidative stress can be reduced in a subject.

As used herein, the term "subject" includes both human and animal subjects. Thus, veterinary therapeutic uses are provided in accordance with the presently disclosed subject matter. As such, the presently-disclosed subject matter provides for the treatment of mammals such as humans, as well as those mammals of importance due to being endangered, such as Siberian tigers; of economic importance, such as animals raised on farms for consumption by humans; and/or animals of social importance to humans, such as animals kept as pets or in zoos. Examples of such animals include but are not limited to: carnivores such as cats and dogs; swine, including pigs, hogs, and wild boars; ruminants and/or ungulates such as cattle, oxen, sheep, giraffes, deer, goats, bison, and camels; and horses. Also provided is the treatment of birds, including the treatment of those kinds of birds that are endangered and/or kept in zoos, as well as fowl, and more particularly domesticated fowl, i.e., poultry, such as turkeys, chickens, ducks, geese, guinea fowl, and the like, as they are also of economic importance to humans. Thus, also provided is the treatment of livestock, including, but not limited to, domesticated swine, ruminants, ungulates, horses (including race horses), poultry, and the like.

The presently-disclosed subject matter is further illustrated by the following specific but non-limiting examples.

EXAMPLES

Example 1

Poly (β-amino ester) Hydrogel Synthesis

To develop and synthesize a polymeric compound with tunable end properties that could be utilized for the controlled release of antioxidants, a single-step polymerization method was first developed for synthesizing poly(β-amino ester) (PβAE) biodegradable hydrogels that makes use of a Michael addition reaction between a difunctional diacrylate and a tetrafunctional primary diamine to thereby create a crosslinked biodegradable hydrogel. Briefly, to synthesize the PβAE biodegradable hydrogels, poly(ethylene glycol) 400 diacrylate (PEG400DA) and diethylene glycol diacrylate (DEGDA) were first purchased from Polysciences, Inc. (Warrington, Pa.) and three primary diamines, 4,7,10-Trioxa-1,13-tridecane diamine (TTD), 2,2' (ethylenedioxy)bis ethylamine (EDBE), and Hexamethyldiamine (HMD) were obtained from Sigma Aldrich (St. Louis, Mo.).

The PβAE hydrogels were then synthesized by a conjugate addition reaction, or one-step Michael addition reaction, of diacrylates and primary diamines as depicted in the schematic diagram provided in FIG. 1. In the synthesis reactions, two different diacrylates and three primary diamines were used for hydrogel synthesis, and the desired amount of diacrylate (PEG400DA and DEGDA) was mixed with THF solvent (50 wt % with respect to total monomer). The primary diamine (TTD, EDBE and HMD) was then added to that solution at a set molar ratio to the total diacrylate content. To study the effect of varying the molar ratio of total acrylate to amine reactive groups (RTAA) on hydrogel synthesis, the RTAA was varied in some reactions from 0.25 to 1.65. Regardless of the RTAA used in the reaction, however, once the diacrylate and diamine molecules were mixed, the solution was then transferred to a glass plate assembly, and the synthesis was carried out overnight in an oven at 50° C. After reaction, the gels were washed in THF and dried.

Figure 2A:
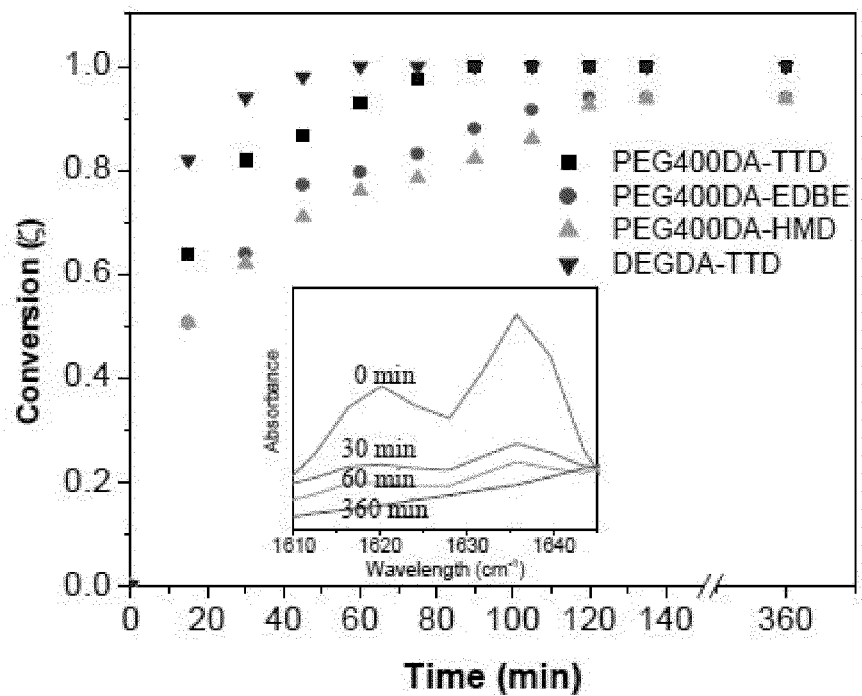
FIGS. 2A and 2B are graphs showing the results of Attenuated Total Reflection-Fourier Transform Infrared (ATR-FTIR) spectroscopy experiments used to monitor the conversion of acrylate double bonds in the synthesis scheme shown in FIG. 1, including: a graph showing double bond conversion versus time curves for different diacrylate and diamine systems (ratio of acrylate reactive groups to amine reactive group (RTAA)=0.6), where the insert image is the decrease in the intensity of double bond peak in a poly(ethylene glycol) 400 diacrylate-4,7,10-trioxa-1,13-tridecane diamine (PEG400DA-TTD) system at start, 30, 60 and 360 mins (FIG. 2A); and a graph showing the change in area of the NH peak for different hydrogel systems, where the insert images shows the decrease in 3379 cm$^{-1}$ peak intensity with time (FIG. 2B)
Figure 2B:
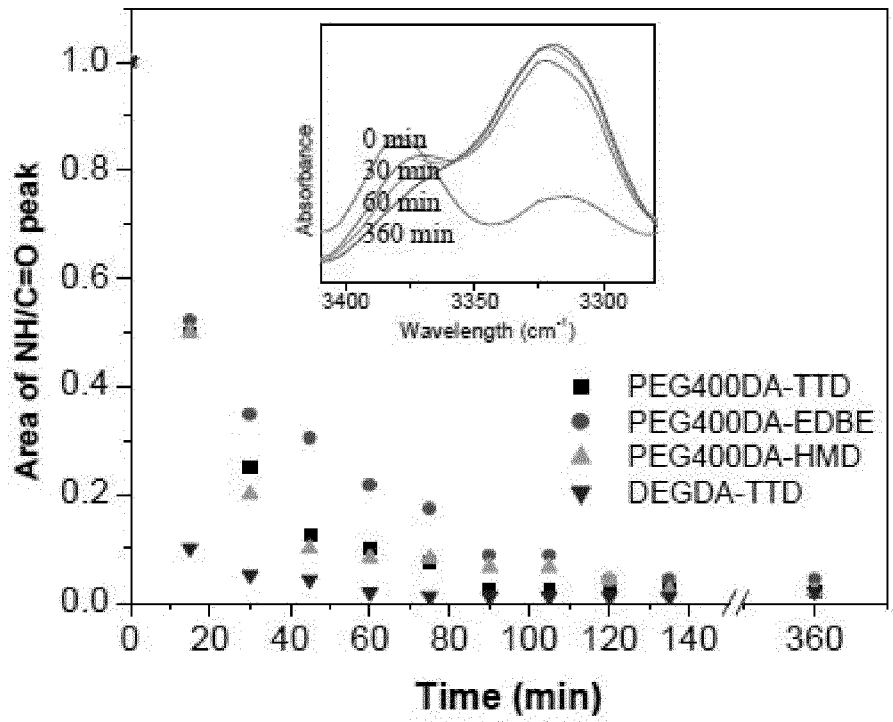
Figure 3A:
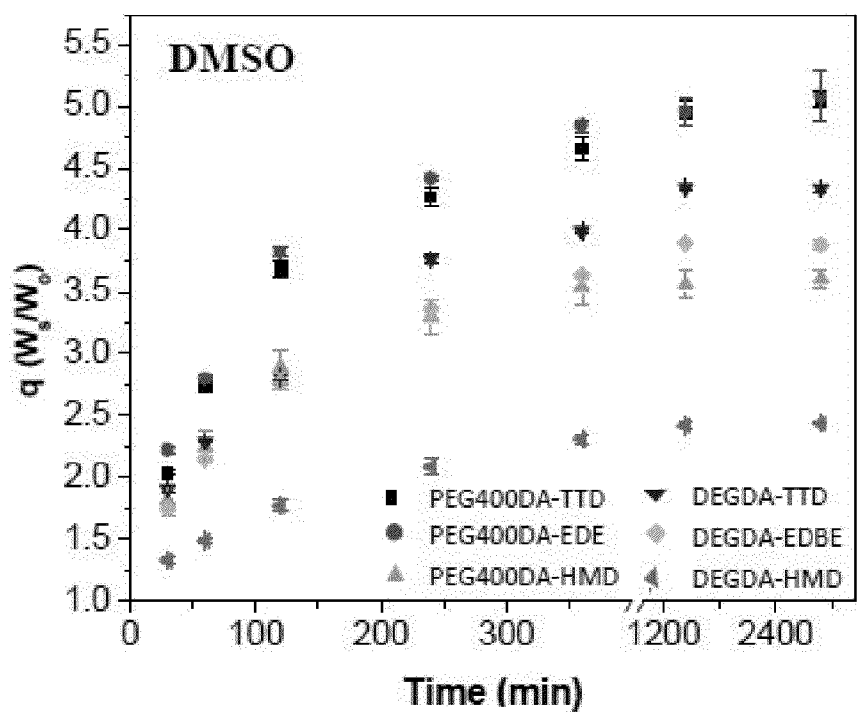
FIGS. 3A-3D and FIG. 3E are graphs and an image, respectively, showing the swelling responses of different polymeric compounds of the presently-disclosed subject matter in dimethyl sulfoxide (DMSO.
Figure 3B:
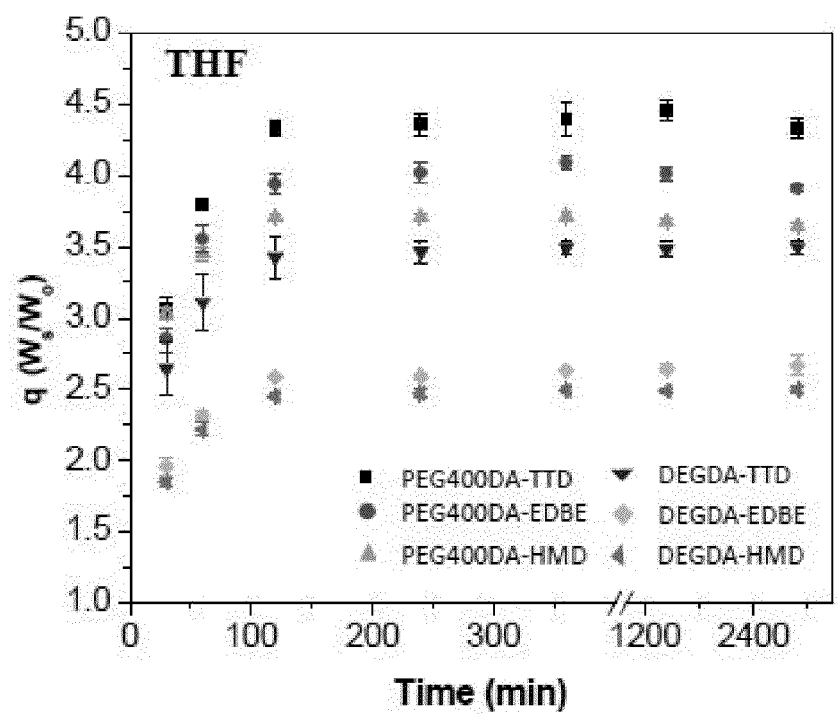
Figure 3C:
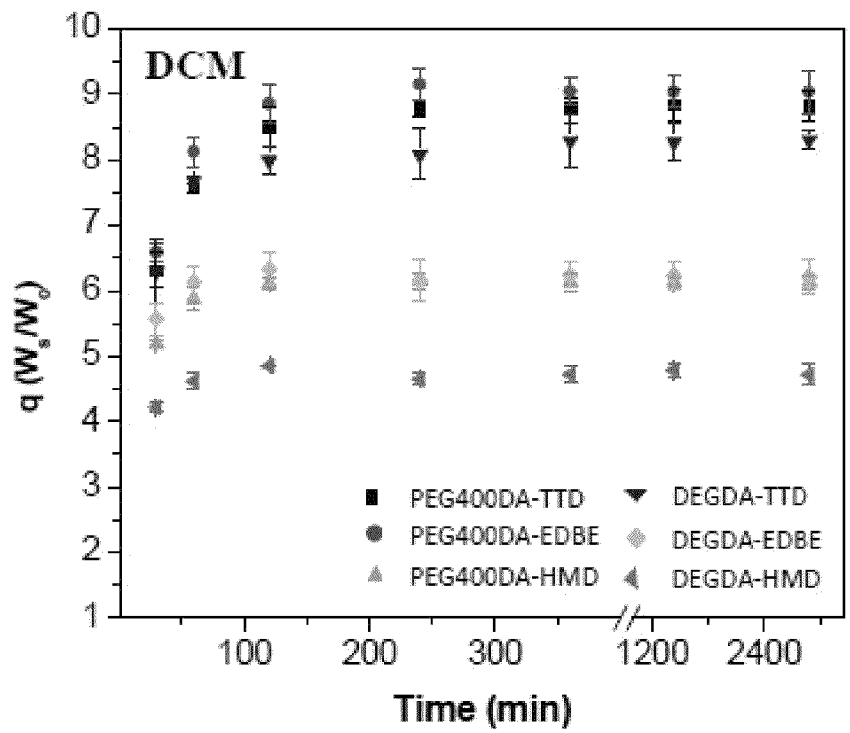
Figure 3D:
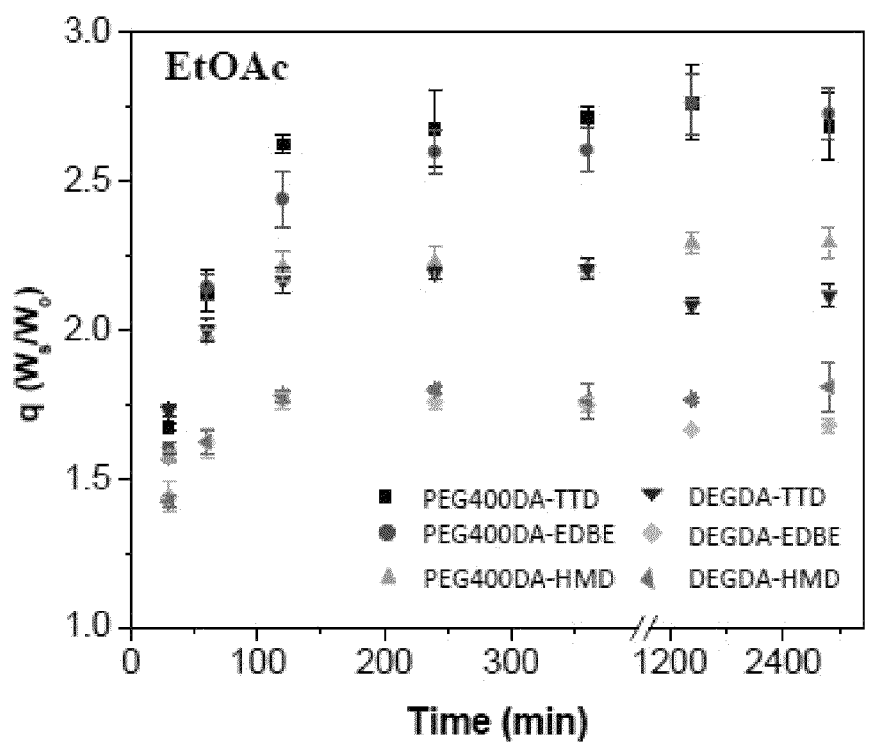
Figure 3E:
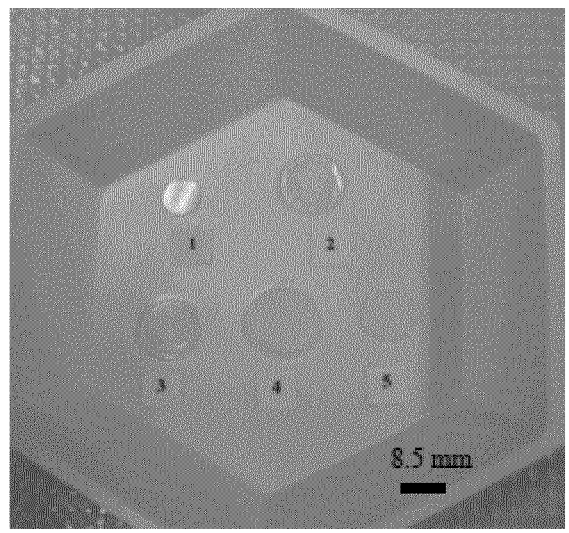

During the synthesis of the hydrogels, the reaction kinetics of the polymerization were observed using ATR-FTIR (Varian 7000e FTIR spectrometer) to determine the conversion of acrylate double bonds. The conversion of C=C as monitored by FTIR in a reaction mixture with a RTAA of 0.6 is shown in FIG. 2A. For the reaction of PEG400DA with three different primary diamines, the rate of reaction of the PEG400DA-TTD system was faster than the PEG400DA-EDBE and PEG400DA-HMD systems. Without wishing to be bound by any particular theory, it was believed that the longer spacer between the amine groups in the diamine molecules facilitated the reaction of the amine groups with the double bonds. However, the rate of reaction of the PEG400DA-EDBE and PEG400DA-HMD systems remained similar. Among the PEG400DA-TTD and DEGDA-TTD systems, the rate of reaction of the latter system was faster than the former. The insert image in FIG. 2A shows the decrease in intensity of the double bonds in the PEG400DA-TTD system at different time points. FIG. 2B shows the decrease in intensity of NH-stretching peak at 3379 $cm^{-1}$ with respect to C=O peak at 1730 $cm^{-1}$. The insert image in FIG. 2B shows the decrease in the intensity of the 3379 $cm^{-1}$ peak of PEG400DA-TTD system at different time points. Residual primary/secondary amines were observed in all embodiments of the synthesized networks.

For the synthesized polymers that were observed, when the RTAA was greater than 1, unreacted —C=C and unreacted amines were observed in all hydrogel networks as studied by FTIR. In the tested embodiments, as the degree of polymerization increased, the viscosity of the system increased. The residual double bonds and amines were not completely reacted even after carrying out the reactions for a long period of time. It was also observed that the rate of the reaction decreased and the gelation time point increased as the diacrylate content in the systems increased. Without wishing to be bound by an particular theory, it was believed that this was due to the increase in viscosity of the system that may restrict monomer segment mobility and transport in the medium, which may influence the kinetics of crosslink formation [11].

Example 2

Poly (β-amino ester) Hydrogel Swelling Analysis

To analyze the swelling properties of the PβAE hydrogels, swelling studies were carried out using PβAE hydrogels with a RTAA of 0.6 in different solvents, including dimethyl sulfoxide (DMSO), tetrahydrofuran (THF), dichloromethane (DCM) and ethyl acetate (EtOAc), at room temperature. Briefly, the initial mass of the hydrogel discs were first recorded ($W_o$), and then the discs were placed in the corresponding solvents at room temperature. The discs were subsequently removed from the solvents at a given time, and their masses were recorded in swollen state ($W_s$). The same solvents were used throughout the swelling studies. The swelling state of the gel was then characterized by a mass swelling ratio, q, equal to $W_s$ over $W_o$.

The degree of swelling in different solvents for PEG400DA and DEGDA systems are presented in FIGS. 3A-3D. For all the systems in THF (FIG. 3B), DCM (FIG. 3C) and EtOAc (FIG. 3D), maximum swelling was achieved in approximately 2 hrs. When DMSO was used as a solvent (FIG. 3A), maximum swelling was observed in approximately 6 hrs. For the tested embodiments, a greater degree of swelling was observed in DCM (FIG. 3C) in comparison to the other solvents.

To further analyze the effect of the polymer/solvent system on the extent of swelling, the polymer-solvent interaction parameters were calculated as the sum of enthalpic ($\chi_H$) and entropic ($\chi_S$) components (Eq. 1) [9]. $\chi_H$ is related to the Hildebrand solubility parameter (δ) and $\chi_S$ was considered to be constant at 0.34 (Eq. 2). In Eq. 2, $V_s$ is molar volume of the solvent and $\delta_S$ and $\delta_P$ are solubility parameter values for solvent and polymer respectively.

$$\chi = \chi_H + \chi_S \quad (1)$$

$$\chi = \frac{V_S}{RT}(\delta_S - \delta_P)^2 + 0.34 \quad (2)$$

The solubility parameters and molar volumes of the solvents are tabulated in Table 2 below, while values for polymers were calculated using the group contribution method, wherein the solubility parameter is the square root of cohesive energy density (Eq. 3) [9,29]. Values for the cohesive energy and molar volume of different groups polymers were obtained and are tabulated in Table 2 below [29].

$$\delta_{polymer} = \left(\frac{\Sigma Ecoh_i}{\Sigma Vm_i}\right)^{1/2} \quad (3)$$

TABLE 2

Solubility parameter values and molar volumes for solvents.

| Solvents | Solubility Parameter (δ) [(Cal/cm³)^{1/2}] | Molar Volume ($V_m$) (cm³/mol) |
|---|---|---|
| DMSO | 12.0 | 71.3 |
| DCM | 9.7 | 63.9 |
| THF | 9.1 | 79.9 |
| EtOAc | 9.1 | 98.5 |

TABLE 3

Cohesive energy and molar volume values for different groups of polymers.

| | $Ecoh_i$ (J/mol) | | | |
|---|---|---|---|---|
| Group | Hayes | Hoftyzer and Van Krevelen | Fedors | $Vm_i$ (cm³/mol) |
| —CH2— | 4150 | 4190 | 4940 | 16.1 |
| —O— | 6830 | 6290 | 3350 | 3.8 |
| —COO— | 14160 | 3410 | 18000 | 18 |
| —NH— | — | — | 8370 | 4.5 |
| —N< | — | — | 4190 | −9 |

Without wishing to be bound by any particular theory or mechanism, it was believed that the dependence of the extent of swelling on the polymer/solvent system could be explained by the polymer-solvent interaction parameter, which is an indicator of polymer miscibility in the solvent. Similar values of polymer and solvent solubility parameters result in χ<0.5, which is the Flory-Huggins theory criterion for polymer miscibility in the solvent over the entire concentration range. The solubility parameter of the polymer ($\delta_P$) depended on its molecular structure, and the predicted $\delta_P$ values for some of the possible polymeric molecular structures are tabulated in Table 3. These polymer solubility parameter values were used to determine the polymer-solvent interaction parameter (χ) using equation 2. Depending on the RTAA used, PβAE networks may have some unreacted (residual) secondary amines (FIG. 4A) or completely reacted tertiary amines (FIG. 4B). For PβAE gels with RTAA=0.6, FTIR analysis (FIGS. 2A-2B) indicates the presence of unreacted (residual) secondary amines in the PβAE gel.

TABLE 4

Predicted solubility parameters for PβAE polymer networks.

Figure 4A:
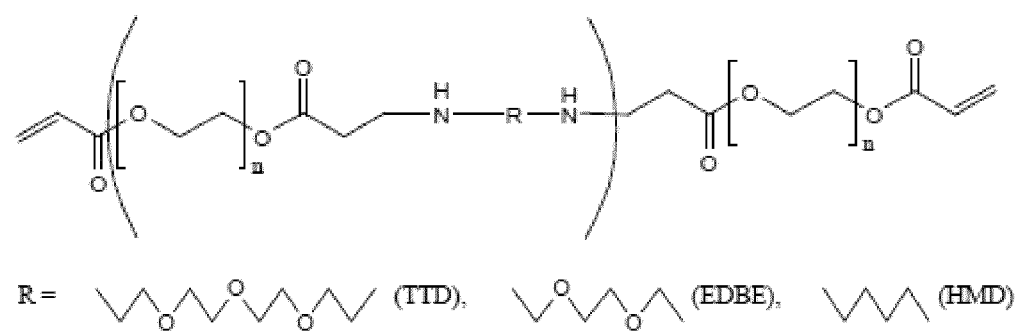
FIGS. 4A-4C are schematic diagrams showing chemical structures for exemplary poly(β-amino ester) (PβAE) compounds made in accordance with the presently-disclosed subject matter, including a diagram showing a PβAE compound with unreacted secondary diamines (FIG. 4A), a diagram showing a PβAE compound where all the amines are reacted (FIG. 4B), and a diagram showing a PβAE compound where secondary amines are capped with an ethyl group (FIG. 4C)
Figure 4B:
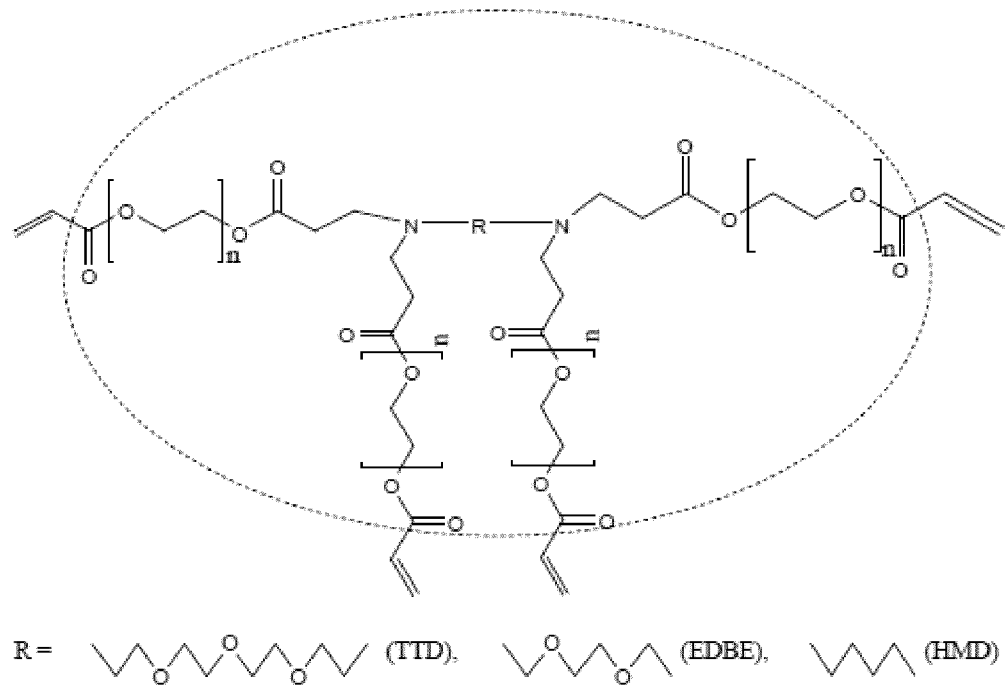
Figure 4C:
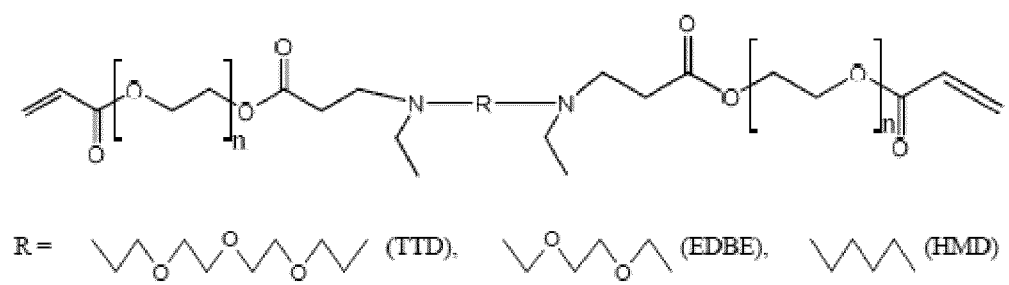

| Polymer Molecular Structure | | —O— | —COO— | —CH2— | —NH— | —N< | —CH3— | Σ $Ecoh_i$ (J/mol) | Σ $Vm_i$ (cm³/mol) | Solubility Parameter ($\delta_P$) (Cal/cm³)^{1/2} |
|---|---|---|---|---|---|---|---|---|---|---|
| FIG. 4a | PEG400DA-TTD | 11 | 1 | 30 | 2 | 0 | 0 | 219790 | 549.3 | 9.78 |
| | PEG400DA-EDBE | 10 | 1 | 26 | 2 | 0 | 0 | 196680 | 481.1 | 9.88 |
| | PEG400DA-HMD | 8 | 1 | 26 | 2 | 0 | 0 | 189980 | 473.5 | 9.79 |
| | DEGDA-TTD | 4 | 1 | 16 | 2 | 0 | 0 | 127180 | 297.3 | 10.11 |
| | DEGDA-EDBE | 3 | 1 | 12 | 2 | 0 | 0 | 104070 | 229.1 | 10.42 |
| | DEGDA-HMD | 1 | 1 | 12 | 2 | 0 | 0 | 97370 | 221.5 | 10.25 |
| FIG. 4b | PEG400DA-TTD | 39 | 8 | 90 | 0 | 2 | 0 | 727630 | 1734.2 | 10.01 |
| | PEG400DA-EDBE | 38 | 8 | 86 | 0 | 2 | 0 | 704520 | 1666 | 10.05 |
| | PEG400DA-HMD | 36 | 8 | 86 | 0 | 2 | 0 | 697820 | 1658.4 | 10.03 |
| | DEGDA-TTD | 11 | 8 | 34 | 0 | 2 | 0 | 357190 | 726.2 | 10.84 |
| | DEGDA-EDBE | 10 | 8 | 30 | 0 | 2 | 0 | 334080 | 658 | 11.02 |
| | DEGDA-HMD | 8 | 8 | 30 | 0 | 2 | 0 | 327380 | 650.4 | 10.97 |
| FIG. 4c | PEG400DA-TTD | 19 | 4 | 52 | 0 | 2 | 2 | 410330 | 1041.4 | 9.70 |
| | PEG400DA-EDBE | 18 | 4 | 48 | 0 | 2 | 2 | 387220 | 973.2 | 9.75 |
| | PEG400DA-HMD | 16 | 4 | 48 | 0 | 2 | 2 | 380520 | 965.6 | 9.70 |
| | DEGDA-TTD | 5 | 4 | 24 | 0 | 2 | 2 | 225110 | 537.4 | 10.01 |
| | DEGDA-EDBE | 4 | 4 | 20 | 0 | 2 | 2 | 202000 | 469.2 | 10.14 |
| | DEGDA-HMD | 2 | 4 | 20 | 0 | 2 | 2 | 195300 | 461.6 | 10.06 |

Under certain conditions, equilibrium swelling is inversely proportional to the $\chi$ value. Equilibrium swelling ratio versus $\chi$ for different PβAE network structures are plotted in FIGS. 5A-5C. As observed, PβAE gels swelled in the solvents in the order DCM>THF>EtOAc. Also, hydrogels synthesized from PEG400DA swell to a greater extent than the corresponding hydrogels made from DEGDA. Swelling, as described by the Flory-Rehner equation, is also a function of molecular weight between the crosslinks ($M_c$). According to the $\chi$ values calculated previously by others [17], PEG has a lower solubility in DMSO as compared to THF, which may result in less swelling of PEG-based PβAE in DMSO, rather than in THF. However, it was observed that the swelling of embodied PβAE gels in DMSO was comparable to the swelling observed in THF and EtOAc, indicating that predictions of polymer-solvent interaction parameter may deviate for polar solvents or polar polymer networks [29]. Without wishing to be to be bound by any particular theory, it was believed that the highly polar nature of DMSO and its interaction with PEG in the PβAE network could be the reason for the failure to predict $\chi$ accurately in case of PβAE-DMSO system.

Figure 5A:
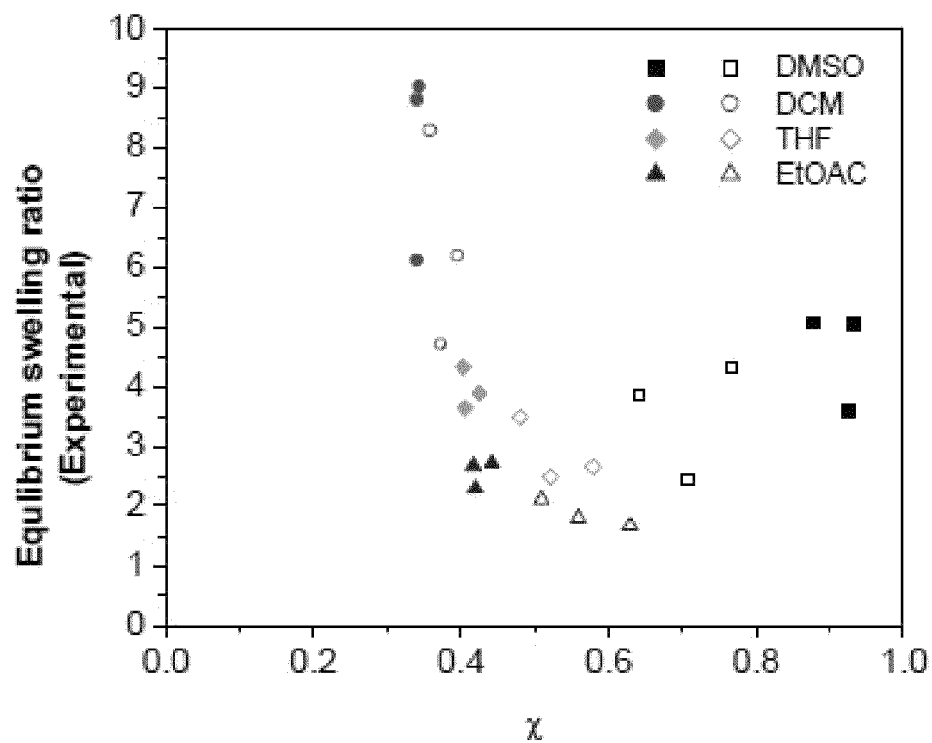
FIGS. 5A-5C are graphs showing the correlation between equilibrium swelling and χ for the corresponding PβAE systems shown in FIGS. 4A-4C, where the solid plots in each graph represent PEG400DA systems and where the empty plots represent diethylene glycol diacrylate (DEGDA) systems.
Figure 5B:
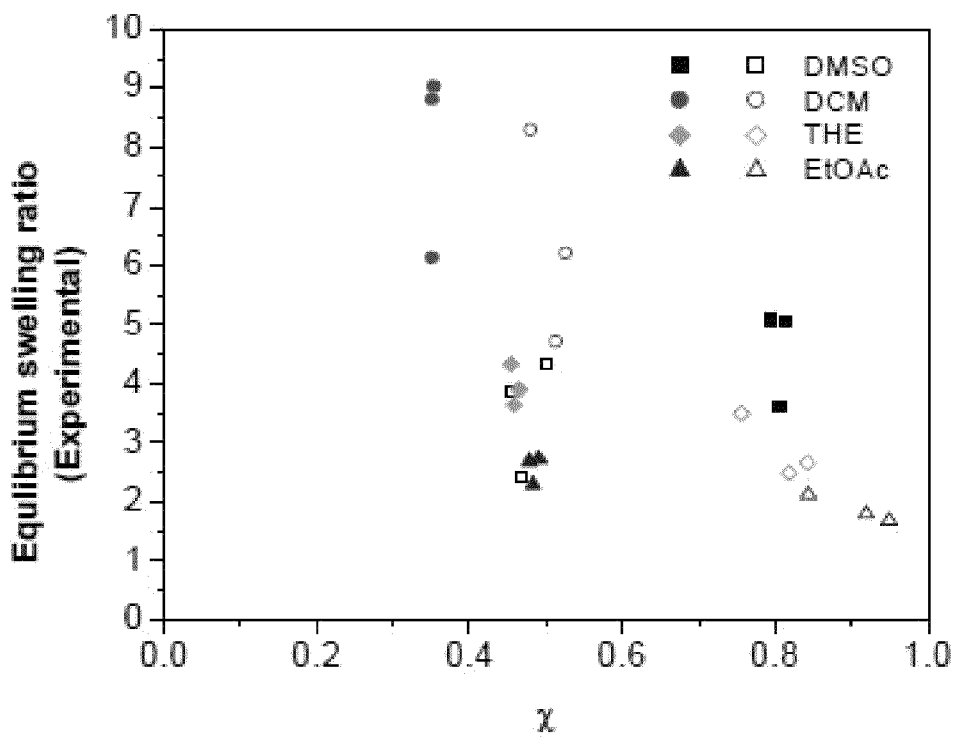
Figure 5C:
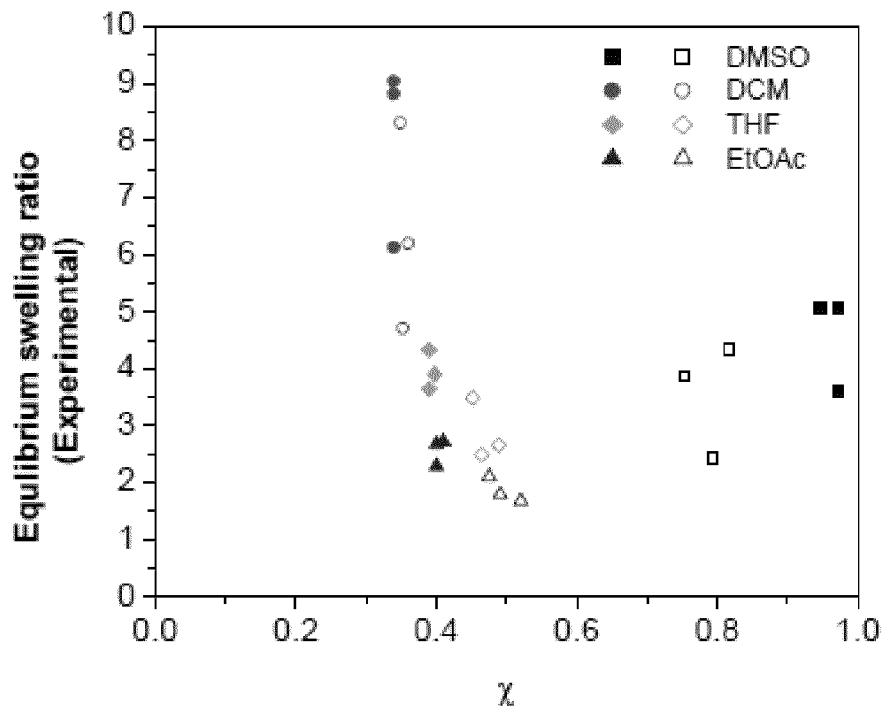

To further examine whether PβAE-solvent interactions are affected in DCM, THF, EtOAc and DMSO solvents by PEG density in the PβAE network, and not by the presence of secondary/tertiary amines in the network, $\chi$ values for a hypothetical polymer network (FIG. 4C) were calculated where the secondary amines (FIG. 4A) were ethyl-capped. As shown in FIG. 5A and FIG. 5C, $\chi$ values for PβAE-solvent systems did not change significantly after ethyl-capping secondary amines in the PβAE network. However, by increasing the PEG density in the PβAE network, as shown in FIG. 4B, $\chi$ values changed significantly for PEG400DA systems. Thus, for the tested embodiments, $\chi$ depends on PEG density in the network.

Example 3

Poly (β-amino ester) Hydrogel Degradation Analysis

To evaluate the degradation properties of the PβAE hydrogels that were synthesized according to the methodology described herein above, degradation studies of PβAE hydrogels were carried out in phosphate buffer solution (PBS) at 37'C (pH 7.4). At given time points, each set of gels were removed from the PBS and flash frozen in liquid nitrogen and freeze dried in order to remove any residual water. The fraction of mass remaining was calculated from the ratio of the recorded final dry mass ($W_d$) and initial mass ($W_o$) values.

Figure 6:
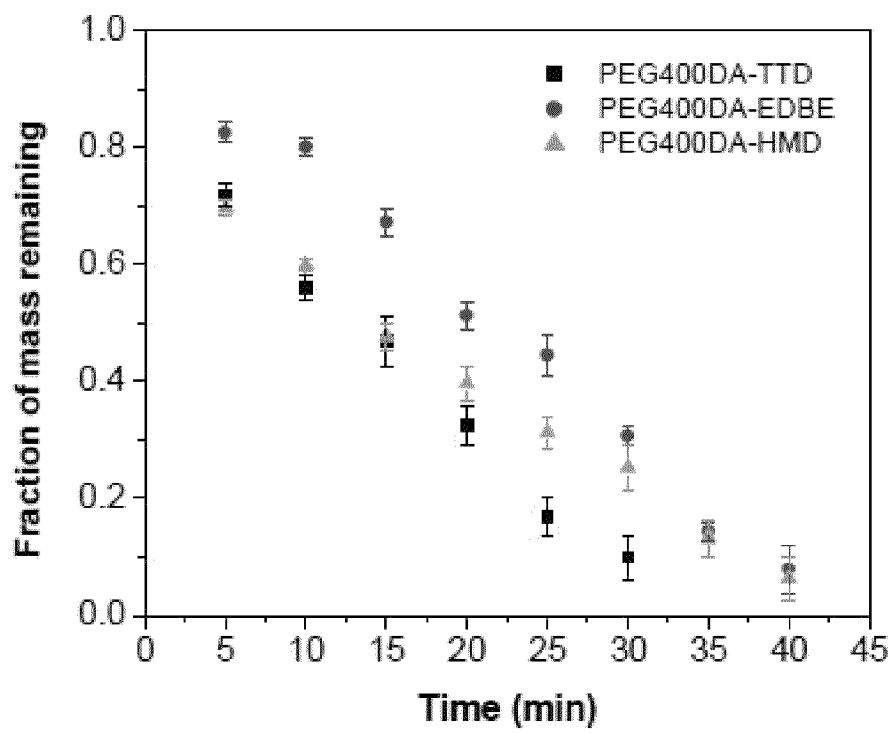
FIG. 6 is a graph showing the degradation profiles of PEG400DA hydrogels with different diamines (4,7,10-Trioxa-1,13-tridecane diamine (TTD); 2,2' (ethylenedioxy)bis ethylamine (EDBE); and hexamethyldiamine (HMD)) at an RTAA of 0.6 in phosphate-buffered saline (PBS) at 37° C.
Figure 7:
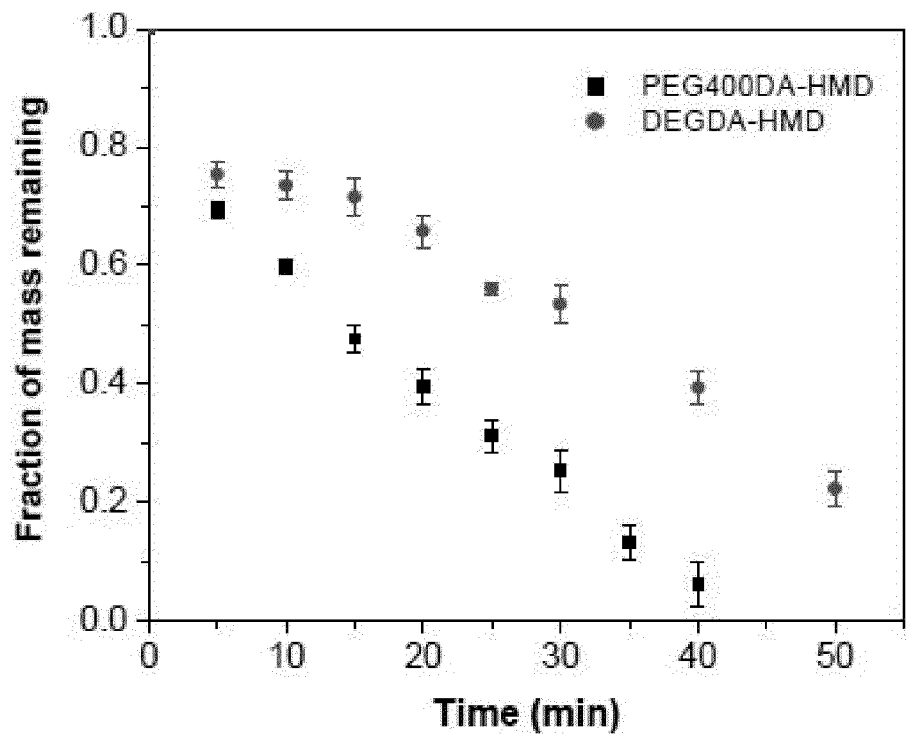
FIG. 7 is a graph showing degradation profiles of PEG400DA-HMD and DEGDA-HMD hydrogels with a RTAA of 0.6 in PBS at 37° C.

FIG. 6 shows the degradation profiles of hydrogel systems of PEG400DA-TTD, PEG400DA-EDBE, and PEG400DA-HMD with a RTAA of 0.6. PEG400DA-TTD hydrogel degraded faster than the PEG400DA-EDBE and PEG400DA-HMD systems. The more hydrophobic PEG400DA-HMD hydrogel degraded completely in approximately 40 min. The DEGDA-HMD system degraded slower than the PEG400DA-HMD system (FIG. 7). The systems with a more hydrophilic nature may absorb more water, which may lead to an increase in the hydrolysis and degradation rates. PβAE hydrogels may degrade via hydrolysis of ester groups in the crosslinks to lower molecular weight degradation products and kinetic chains of poly(β-amino acids) and diols [3, 10].

Figure 8:
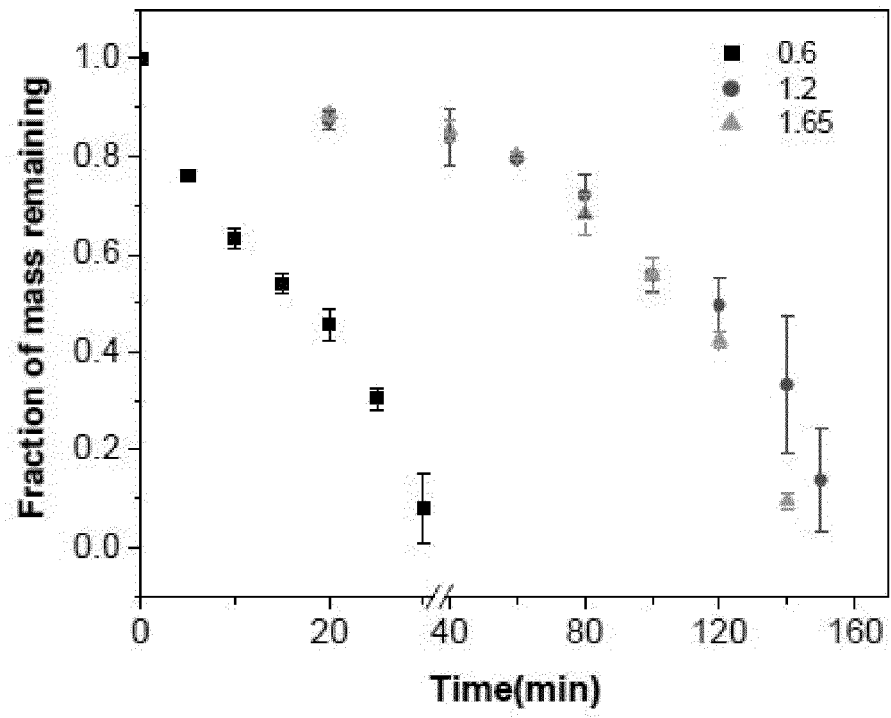
FIG. 8 is a graph showing degradation profiles of PEG400DA-TTD hydrogels with different RTAA in PBS at 37° C.

In the experiments, it was further observed that the degradation rate was dependent on the hydrophilicity of the diacrylate and/or diamine. In addition, the degradation rate could be affected by the presence of unreacted primary and secondary amine groups within the hydrogel matrix. The presence of unreacted amines can undergo an intra/intermolecular amidation with ester bonds and thereby enhance the degradation rate [15, 33]. In order to study the effects of unreacted amine groups on the degradation rate, different grades of hydrogels with varying RTAA were synthesized, and their degradation behaviors were studied. As the relative diacrylate content was increased in the reaction systems, the amount of unreacted amine groups decreased. FIG. 8 shows the degradation profiles of PβAE hydrogels synthesized with varying RTAAs.

In the foregoing experiments, it was observed that with increased RTAA, the degradation rate was decreased. In addition to water hydrolysis, the degradation of PβAE synthesized from diacrylate and diamine was also hydrolyzed by its own amine groups. As the amine group has stronger nucleophilicity, it was though that a polymer with more unreacted amine groups degraded faster than a polymer with fewer unreacted amine groups. For the systems with lower RTAAs (<1) and higher amine content in the network, primary and secondary amines can play a role in intra and/or intermolecular nucleophilic attack on ester bonds and undergo amide formation. For PβAE hydrogels with free primary amines, the polymer degradation takes place, at least in part, by the attack of free hydroxyl ions and intra/intermolecular amines. However, with only secondary amine in the hydrogel network, the intramolecular amidation was difficult due to the hindered reactivity of the secondary amines with the ester groups in the backbone.

Example 4

Poly (β-amino ester) Hydrogel Mechanical Analysis

To analyze the mechanical behaviors of the PβAE hydrogels synthesized according to the foregoing methodologies, various hydrogels were synthesized and were cut into 10 mm discs with a thickness of 1.5 mm. A Bose ELF 3300 test system was used to perform unconfined compression testing between two impermeable and unlubricated platens. Samples were subjected to a strain rate of 100% $\text{min}^{-1}$ up to a maximum load of 200 N. The compressive modulii were calculated as the slope of stress versus strain in the linear range, up to a strain of 0.15.

Figure 9:
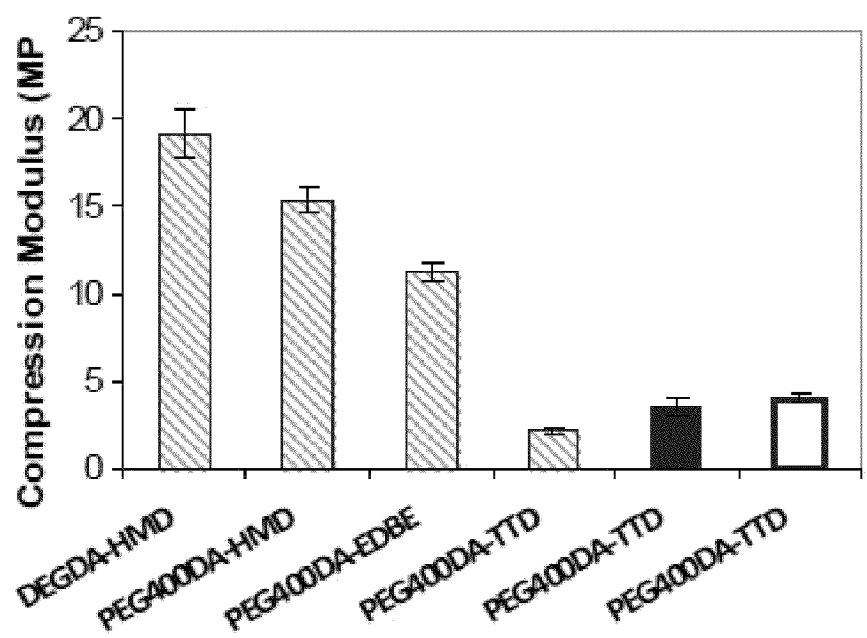
FIG. 9 is a graph showing the compressive modulus of dry PβAE hydrogels where the dashed bars show the results with hydrogels having a RTAA of 0.6, the filled bars show the results of hydrogels having an RTAA of 1.2; and the empty bars show the results of hydrogels having a RTAA of 1.65.

FIG. 9 shows the compressive modulus for the hydrogel systems. The compression modulii that were obtained were similar to that previously reported from other PβAE hydrogels [31]. It was observed that the diamine had an effect on the compressive modulii of the hydrogels, while there was not as great an effect from the diacrylate for these systems. RTAA was observed to have a minimal effect on the compression moduli.

Example 5

Synthesis and Characterization of Antioxidant Multiacrylates

To examine whether the foregoing modified non-free-radical polymerization scheme for synthesizing PβAE hydrogels could be extended to synthesize antioxidant polymers with tunable properties, acrylate functionalized antioxidants were synthesized and examined. Briefly, for the synthesis of the antioxidant acrylates, and in addition to the materials set forth in Example 1, quercetin, curcumin, acrylate chloride, methylthiazolyldiphenyl-tetrazolium bromide (MTT), triethylamine and 2,2'-azo-bis(2-aminopropane)-HCl (AAPH) were first obtained from Sigma-Aldrich (St. Louis, Mo.), and were then used as received. Antioxidant acrylates were then synthesized by reacting phenolic antioxidants with acryloyl chloride (also referred to as acrylate chloride herein) in tetrahydrofuran (THF) and triethylamine at room temperature for 12 hrs [8]. Antioxidants (quercetin or curcumin) were dissolved in THF at a concentration of 100 mg/ml. Triethylamine ($Et_3N$) was added to the solution at a $Et_3N$:antioxidant ratio of 4:1 and 2:1 for quercetin and curcumin, respectively. Acrylate chloride was slowly added to the reaction mixture while being stirred on an ice bath. Initial molar ratio of acryloyl chloride: antioxidant was 4.5:1 and 2.5:1 for quercetin and curcumin, respectively. The reaction was then allowed to proceed at room temperature under dark conditions for 12 hrs. After this reaction, precipitated triethylamine hydrochloride salt was removed by vacuum filtration. Filtrate was subject to vacuum distillation using liquid $N_2$ trap to remove THF. To remove unreacted acryloyl chloride from the product, the resultant powder was re-dissolved in dichloromethane (DCM) (30 ml) and subsequently extracted with 0.1 M $K_2CO_3$ (3×120 ml) and DI water (3×120 ml), and then dried over $MgSO_4$. The solution was then filtered using vacuum filtration and the solvent was removed under vacuum using a roto-evaporator (Rotovapor R II, Buchi, Switzerland). Synthesized antioxidant multiacrylates were characterized using FT-IR and $^1$H-NMR spectroscopy. The resulting powder was stored at −20° C. until further use.

Figure 10A:
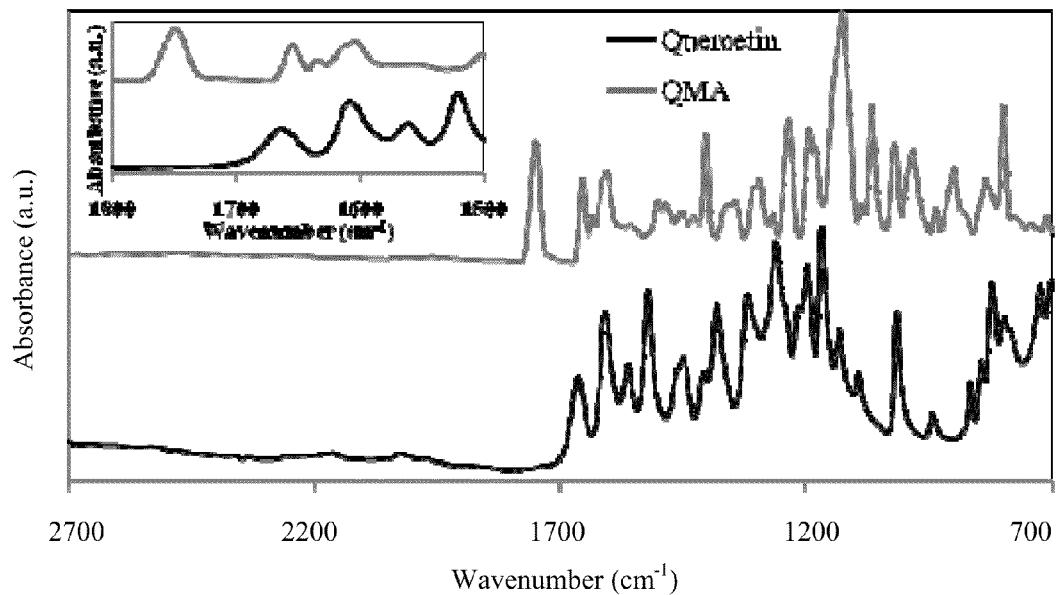
FIGS. 10A and 10B are graphs showing FTIR spectroscopy characterization of quercetin- and curcumin-containing monomeric portions of the presently-disclosed subject matter, respectively, where the antioxidants quercetin and curcumin were functionalized with acrylate groups by reacting quercetin and curcumin with acryloyl chloride, and where the presence of a peak at approximately 1740 $cm^{-1}$ in the spectra of the quercetin-containing monomeric portion (FIG. 10A) and the curcumin-containing monomeric portion (FIG. 10B), is characteristic of an ester carbonyl group, indicating acrylate fictionalization of both the quercetin and curcumin.
Figure 10B:
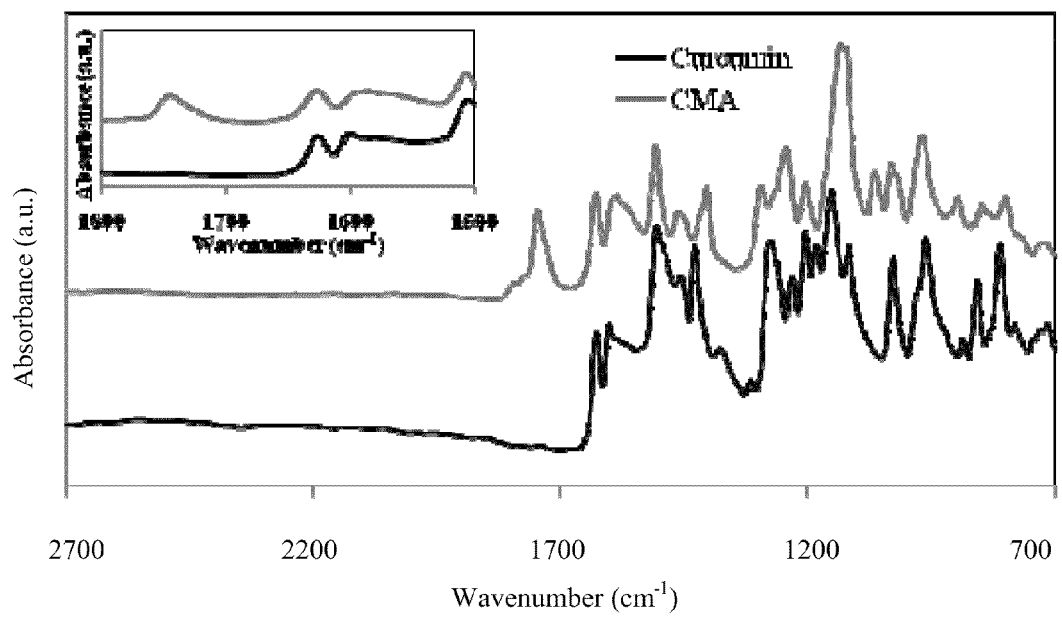
Figure 11:
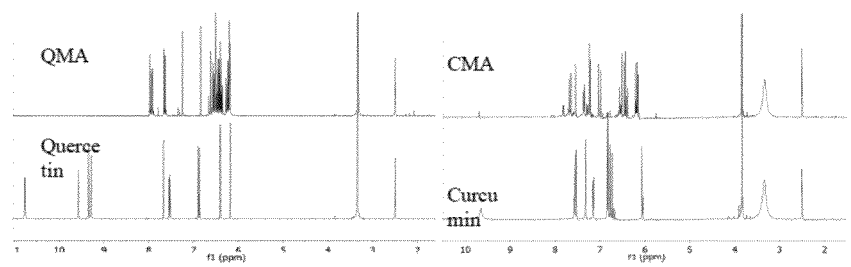
FIG. 11 is a graph showing the $^1$H-NMR characterization of quercetin, a quercetin-containing monomeric portion (QMA), curcumin, and a curcumin-containing monomeric portion (CMA), where the reaction of phenolic groups of antioxidants with acryoyl chloride is confirmed by the absence of characteristic phenol peaks (9-11 ppm) in the QMA and CMA, and where the analysis of the QMA and CMA spectra reveal the presence of 4.28 and 2.66 acrylate groups per molecule of quercetin and curcumin, respectively.

FIGS. 10A-10B and FIG. 11 show FT-IR and $^1$H-NMR characterization of purified antioxidant acrylates, respectively. The peaks at 1740 and 1620 $cm^{-1}$ in the FT-IR spectra of antioxidant multiacrylates (FIGS. 10A-10B) are characteristics of the ester —C═O and —C═C— bonds in the product. Conversion of antioxidant phenolic groups into esters was further confirmed using $^1$H-NMR spectroscopy, where the peaks corresponding to the phenolic —OH in antioxidants (at 10.7 ppm for quercetin, at 9.6 ppm for curcumin) had reduced peak intensities in the NMR spectra of antioxidant multiacrylates. Also, peaks corresponding to —CH═$CH_2$ (in the range of 6.75 to 6 ppm) were present in the spectra of antioxidant acrylates. Average number of acrylate groups per molecule of antioxidant was quantified using $^1$H-NMR spectroscopy, and revealed the presence of 4.28 and 2.66 acrylate groups per molecule of, respectively, quercetin and curcumin.

Example 6

Synthesis of Poly (Antioxidant β-amino Ester) Hydrogels

To further examine whether the foregoing modified non-free-radical polymerization scheme for synthesizing PβAE hydrogels could be extended to synthesize antioxidant polymers with tunable properties, the acrylate functionalized antioxidants synthesized according to the foregoing methodology was subsequently reacted with diacrylates and primary diamines to form a cross-linked network of poly (antioxidant β-amino ester) (PAβAE). Briefly, PAβAE hydrogels were synthesized by a single step addition of acrylates (PEG400DA and antioxidant multiacrylates) and a primary diamine, TTD, as described herein above, with calculated amounts of PEG400DA and primary diamine TTD being first mixed in a 2 ml eppendorf tube. This mixture was then incubated at 50° C. for 5 min. A calculated amount of antioxidant multiacrylate dissolved in DCM solvent (50 wt % solvent with respect to total monomer) was then transferred to the PEG400DA/TTD reaction mixture, mixed thoroughly, and incubated in an oven at 50° C. for 24 hrs. Synthesized hydrogels were then cut into 1 mm thick discs for degradation studies. All discs were washed in THF for 15 min to remove unreacted monomers and dried under vacuum. Different grades of PAβAE hydrogels were prepared by varying the molar ratio of antioxidant multiacrylate: PEG400DA between 0-20% while maintaining the ratio of total acrylates to total amines (RTAA) at 1.2.

PAβAEs with different antioxidant contents were synthesized to provide the polymer system compositions shown below in Table 5 and Table 6. The system with 20% QMA and CMA polymerized faster than the corresponding 10% and 5% systems. FIG. 12 shows an illustrative schematic of the crosslinked network of certain PAβAE hydrogels synthesized according to the procedure.

TABLE 5

Composition of the synthesized quercetin PAβAE hydrogels.

| | wt % | | | mol % | | |
|---|---|---|---|---|---|---|
| Sample Name | PEG400DA | QMA | TTD | PEG400DA | QMA | TTD |
| 0 | 84.70 | 0.00 | 15.30 | 70.60 | 0.00 | 29.40 |
| 5% QMA | 79.78 | 4.28 | 15.93 | 66.09 | 3.48 | 30.43 |
| 10% QMA | 74.95 | 8.49 | 16.55 | 61.71 | 6.86 | 31.43 |
| 20% QMA | 65.53 | 16.71 | 17.76 | 53.33 | 13.33 | 33.33 |

TABLE 6

Composition of the synthesized curcumin PABAE hydrogels.

| | wt % | | | mol % | | |
|---|---|---|---|---|---|---|
| Sample Name | PEG400DA | CMA | TTD | PEG400DA | CMA | TTD |
| 0 | 84.70 | 0.00 | 15.30 | 70.60 | 0.00 | 29.40 |
| 5% CMA | 80.67 | 3.98 | 15.34 | 67.06 | 3.53 | 29.41 |
| 10% CMA | 76.63 | 7.98 | 15.39 | 63.53 | 7.06 | 29.41 |
| 20% CMA | 68.48 | 16.05 | 15.47 | 56.47 | 14.12 | 29.41 |

Example 7

Degradation of PAβAE Hydrogels

To examine the degradation of the PAβAE hydrogels, degradation studies were carried out in PBS at 37° C. (pH 7.4). At given time points, each set of gels were removed from the PBS, flash frozen in liquid nitrogen and freeze dried in order to remove residual water. The fraction of mass remaining was then calculated from the ratio of the recorded final dry mass ($W_d$) and initial ($W_o$) values.

Figure 13A:
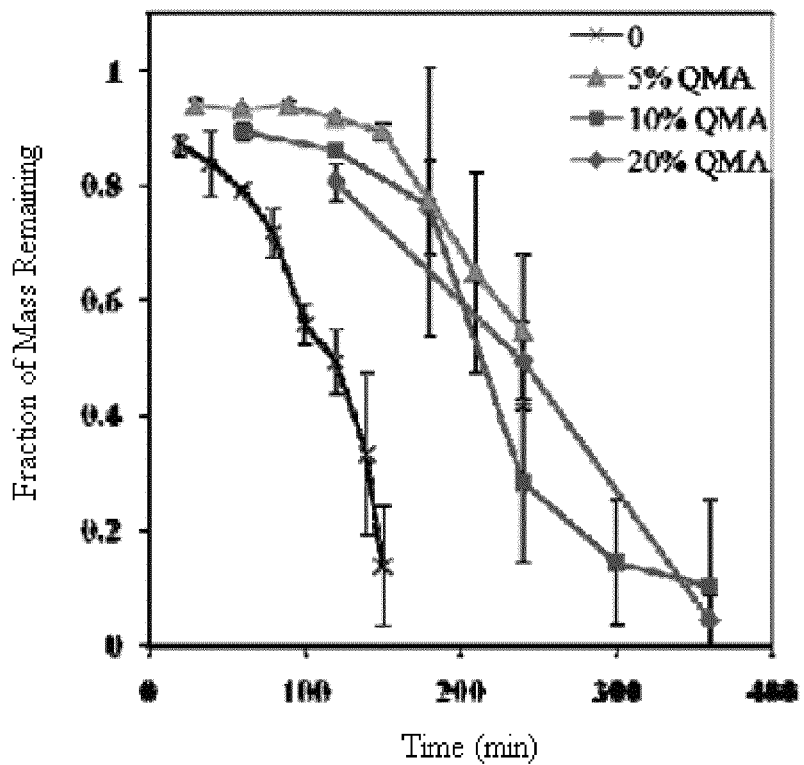
FIGS. 13A-13B are graphs showing degradation profiles of QMA- and CMA-containing PAβAE hydrogels, respectively, as compared to a 0% PAβAE hydrogel.
Figure 13B:
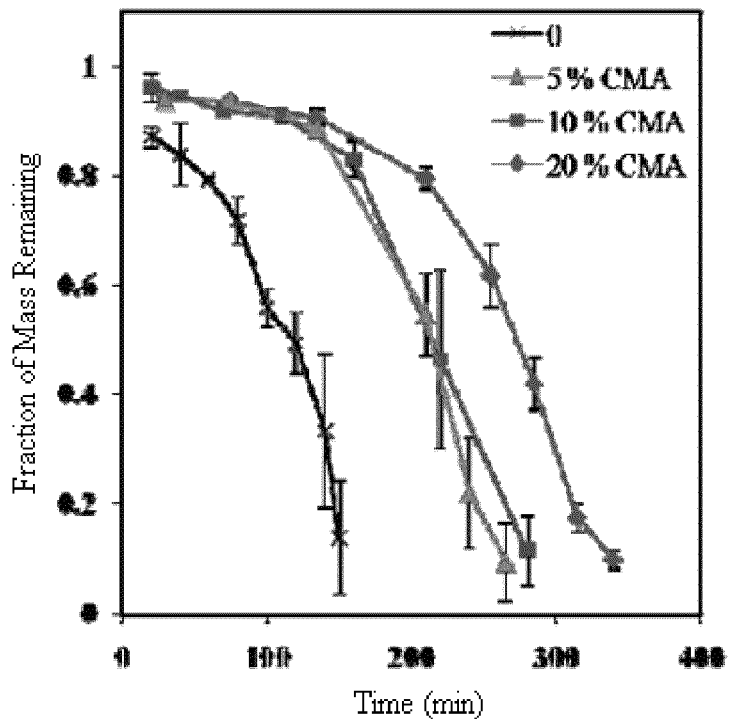

FIG. 13A and FIG. 13B show degradation profiles for, respectively, quercetin and curcumin PAβAE hydrogels. In both quercetin and curcumin PAβAE systems, the pH change associated with degradation was minimal where the pH of the suspension of the degradation products changed from 7.4 to 8 after complete degradation. Hydrogels that did not have antioxidants (0) degraded within 150 minutes as compared to the QMA and CMA PAβAE hydrogels that degraded completely within 5-6 hours. Except for 20% CMA hydrogels, there was not a significant dose dependent effect of polyphenolic content on the hydrogel degradation rate.

Example 8

Cytotoxicity of Degradation Products of PAβAE Hydrogels

To further examine the properties of the PAβAE hydrogels and their ability to be used as a polymer that is capable of controllably releasing an antioxidant molecule, the cytotoxicity of PAβAE degradation products was measured. In this analysis, human umbilical vein endothelial cells (HUVECs) were first purchased from Lonza (Allendale, N.J.) and cultured in EGM-2 media with 2% fetal bovine serum at 37° C. in a humidified atmosphere of 5% $CO_2$, with HUVECs in passages 3 to 5 then being used. To assess the cytotoxicity of the degradation products, the HUVECs were then treated with degradation products of the PAβAEs at different concentrations and a MTT assay was used to measure cell viability after treating cells with the different concentrations of PAβAE degradation products. Briefly, HUVECs were seeded onto a 96-well plate at a cell density of 35,000 cells/$cm^2$, and, 24 hrs later, cell media was replaced with treatment solutions. 24 hrs post treatment, treatment solution was removed, cells were washed twice in PBS, and 200 μL of 0.5 mg/ml MTT solution in cell media was added to each well. The 96-well plate was then incubated at 37° C. for 12 hrs and the cell media was gently removed from the wells. 100 μL of DMSO was added to each well to dissolve the formazan product. The absorbance intensity was recorded, at 570 nm for formazan and at 690 for background, using a Cary-50 Bio UV-Visible spectrophotometer equipped with a Cary 50 MPR microplate reader (Varian, Santa Clara, Calif.).

Figure 14A:
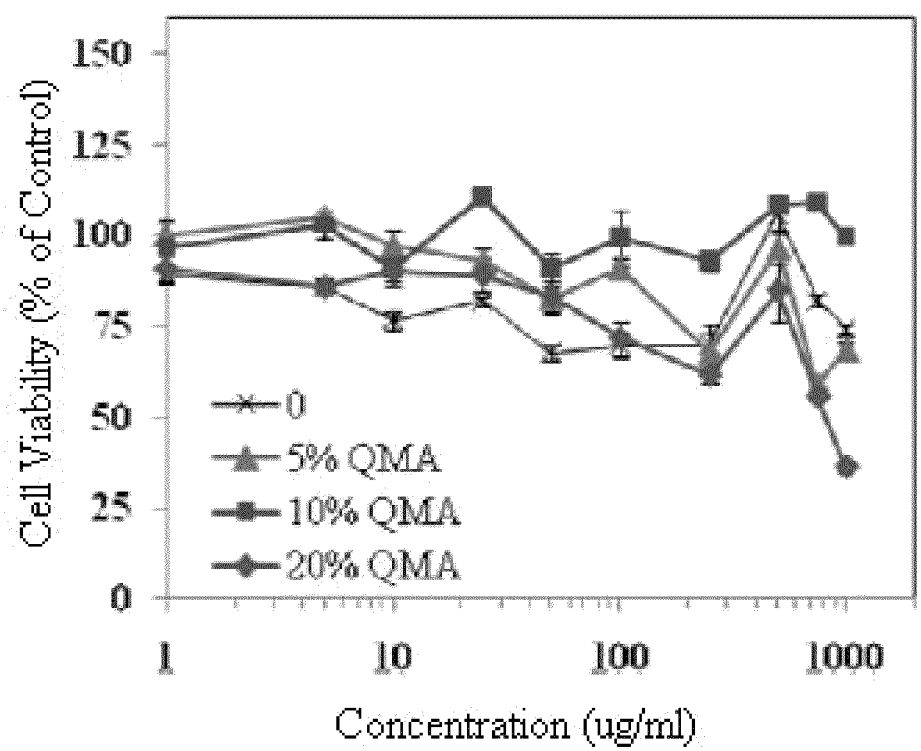
FIGS. 14A-14D are graphs showing the cytotoxicity of the degradation products of the antioxidant polymeric compounds of the presently-disclosed subject matter, where human umbilical vein epithelial cells (HUVECs) were treated with PAβAE degradation products for 24 hrs and, post treatment, cell viability was measured using MTT assay, and where
Figure 14B:
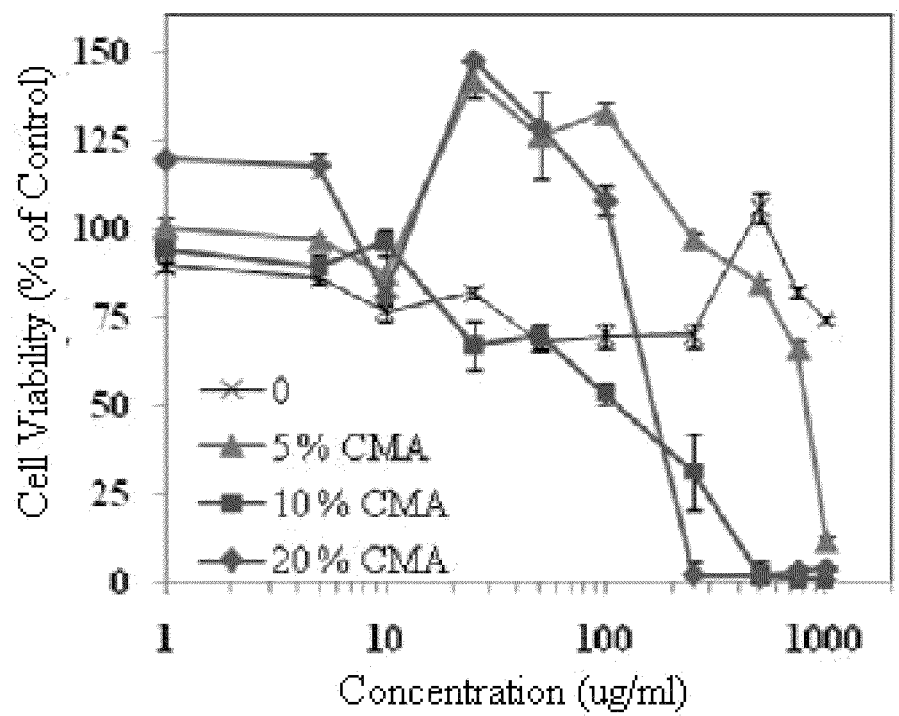

The cell viability measured using the standard MTT assay is shown in FIG. 14A and FIG. 14B. Degradation products of 0% PABAE hydrogels had little cytotoxicity up to a concentration of 1000 μg/ml. Like quercetin, degradation products of quercetin PAPAE hydrogels did not have significant cytotoxicity except for high concentrations of (e.g., 20% QMA) where the cell viability dropped to 35% at a concentration of 1000 μg/ml. Curcumin PAβAE hydrogels, like pure curcumin, were acutely toxic in the order of their curcumin content.

Example 9

Antioxidant Activity of PAβAE Degradation Products

To assess the antioxidant activity of the PAβAE hydrogels, antioxidant activity of the PAβAE degradation products was measured using a DCF fluorescence-based assay [49]. AAPH undergoes thermal degradation and was used to mimic the peroxyl radical formation in vivo. Hydrolysis of DCF-DA results in non-fluorescent DCF, which was then diluted in PBS to a concentration of 10 μM. 100 μL of sample (solution of PAβAE degradation products in PBS) and 100 μL of 10 μM DCF solution was added to a well of a 96-well plate. Fluorescence measurement was started when 20 μL of AAPH solution was added to the well-plate and DCF fluorescence kinetics were monitored for 4 hrs using a Varian Cary Eclipse fluorescence spectrophotometer (excitation at 502 nm, emission at 525 nm). The assay was calibrated using known concentrations of both quercetin and curcumin, and the antioxidant potential of the quercetin and/or curcumin PAβAE degradation products was reported as molar active quercetin/curcumin equivalents.

Figure 15A:
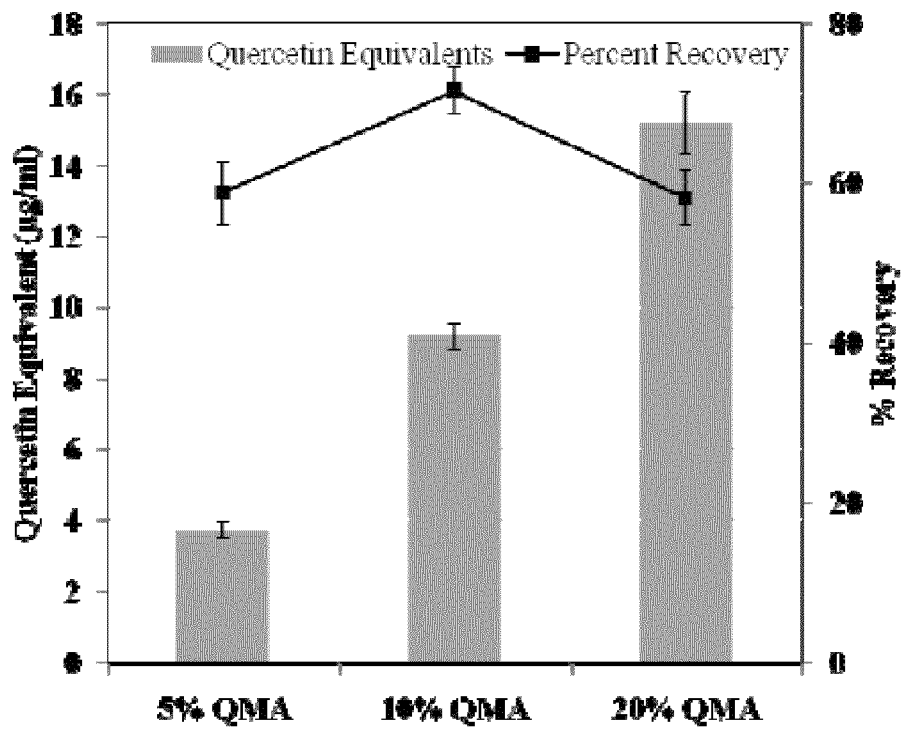
FIGS. 15A-15B are graphs showing in vitro measurements of the antioxidant activity of degradation products of antioxidant polymeric compounds of the presently-disclosed subject matter using a 2',7'-dichlorodihydrofluorescin (DCF)-based fluorescent assay.
Figure 15B:
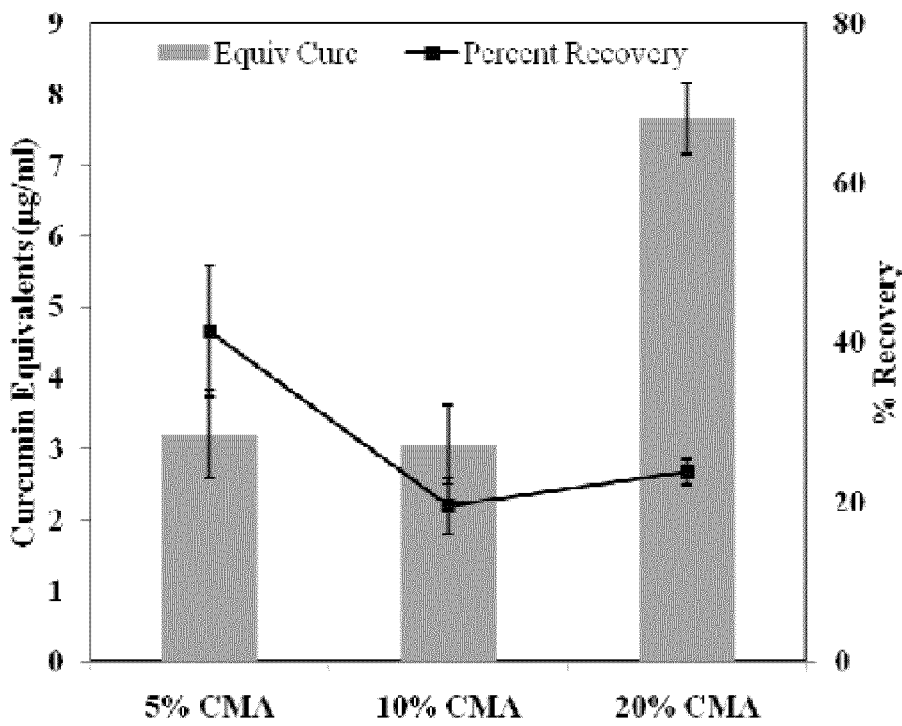

Upon analysis of the results from these experiments, it was found that the total antioxidant activity of quercetin PAβAE hydrogels was directly proportional to the initial QMA content in the hydrogel with approximately 60% recovery as compared to the theoretical activity (FIG. 15A). With respect to curcumin PAβAE hydrogels, recovery of antioxidant activity was lower as compared to quercetin PAβAE (FIG. 15B). Degradation of 5% CMA resulted in 40% recovery of antioxidant activity where as degradation of 10% CMA and 20% CMA resulted in 20% recovery of antioxidant activity.

Example 10

Effects of PAβAE Degradation Products on Oxidative Stress Levels

To analyze the effects of PAβAE degradation products on oxidative stress levels in cells, PAβAE hydrogels were incubated in sterile DI water at 37° C. for 48 hrs to allow for complete degradation. PAβAE degradation products were then freeze dried and dissolved in DMSO at a concentration of 100 mg/ml. These concentrated DMSO solutions were then used to prepare fresh dilute solutions of PAβAE degradation products in cell media. Cells were treated with these PAβAE solutions for their cytotoxicity and their effect on cellular oxidative stress levels. To prepare quercetin and curcumin solutions, antioxidants were dissolved in DMSO at a concentration of 10 mg/ml and diluted in cell media.

2',7'-dichlorodihydrofluorescein (DCF) fluorescence was then used as marker of oxidative stress in the cells. HUVECs were seeded onto a 96-well plate at a density of 35,000 cells/$cm^2$ and incubated at 37° C. After 24 hrs, cell media was replaced with 100 μL of treatment solution (PAβAE degradation products) and 100 μL of 10 μM DCF-DA solution. Fluorescence was measured after another 24 hrs using a bottom-reading GENios Pro fluorescence spectrophotometer (Tecan, Switzerland) at excitation and emission wavelengths of 485 nm and 535 nm respectively.

Figure 16A:
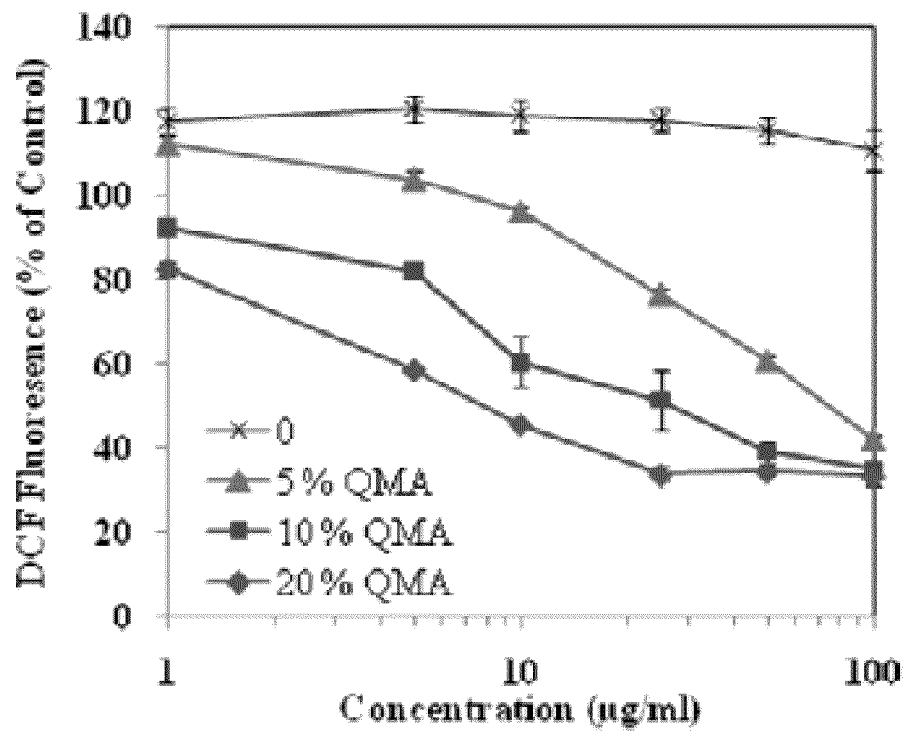
FIGS. 16A-16D are graphs showing oxidative stress levels in HUVECs treated with degradation products of antioxidant polymeric compounds of the presently-disclosed subject matter, where
Figure 16B:
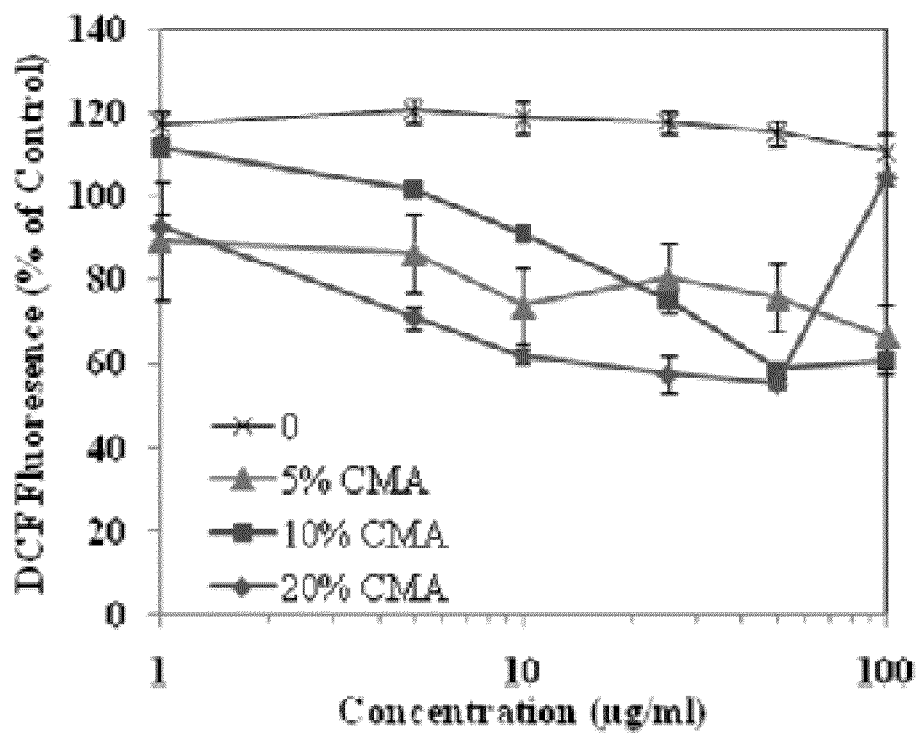

To analyze the results from these studies, DCF fluorescence in the cells was plotted and compared to the untreated cells (% of Control) as shown in FIG. 16A and FIG. 16B. Both antioxidants, quercetin and curcumin, have excitation and emission spectra similar to that of DCF, and in order to avoid background fluorescence from antioxidants, the maximum concentration of PAβAE degradation products that HUVECs were treated with was limited to 100 μg/ml. Degradation products of 0% PAβAE did not affect DCF fluorescence levels in HUVECs and did not exert antioxidant effect on the cells. Quercetin and curcumin PAβAE degradation products showed concentration dependant suppression in DCF fluorescence. At concentration of 100 μg/ml, quercetin and curcumin PAβAE hydrogels suppressed DCF fluorescence to a minimum of 35% and 55%, respectively.

Example 11

Analysis of 4-hydroxy-2-trans-nonenal (HNE)-Induced Oxidative Stress Injury to HUVECs in the Presence of PAME Degradation Products To assess the effect of 4-hydroxy-2-trans-nonenal (HNE)-induced oxidative stress injury to HUVECs in the presence of PAβAE degradation products, transendothelial electrical resistance (TEER) values were measured and used to monitor the permeability and injury of the cells subsequent to exposure to the degradation products of PAβAE and FINE. Briefly, HUVECs were seeded into 24 well plate Transwell inserts (Corning Costar Transwell Plates). Wells were rinsed with HBSS and media replaced every other day. TEER values (EVOM II reader, World Precision Instruments) were monitored every day until resistance stabilization after approximately 7 days. HUVECs were treated with degradation products of PAβAE, including 10% quercetin multiacrylate (QMA) and 10% curcumin multiacrylate (CMA), at a concentration of 100 μg/mL in the cell media for 1 hour. Following prophylactic incubation, and without removing PABAE degradation products, FINE was added to a final concentration 30 µM to induce oxidative injury. TEER was measured before cells were seeded, immediately before addition PABAE degradation products, and 20 hours following FINE incubation, which is consistent with maximum FINE induced injury. Change in TEER was calculated as shown below in Eq. 4.

$$\text{Change in TEER} = (\Omega_{20\,hr} - \Omega_{Transwell\,insert})/(\Omega_{0\,hr} - \Omega_{Transwell\,insert}) \quad (4)$$

Figure 17:
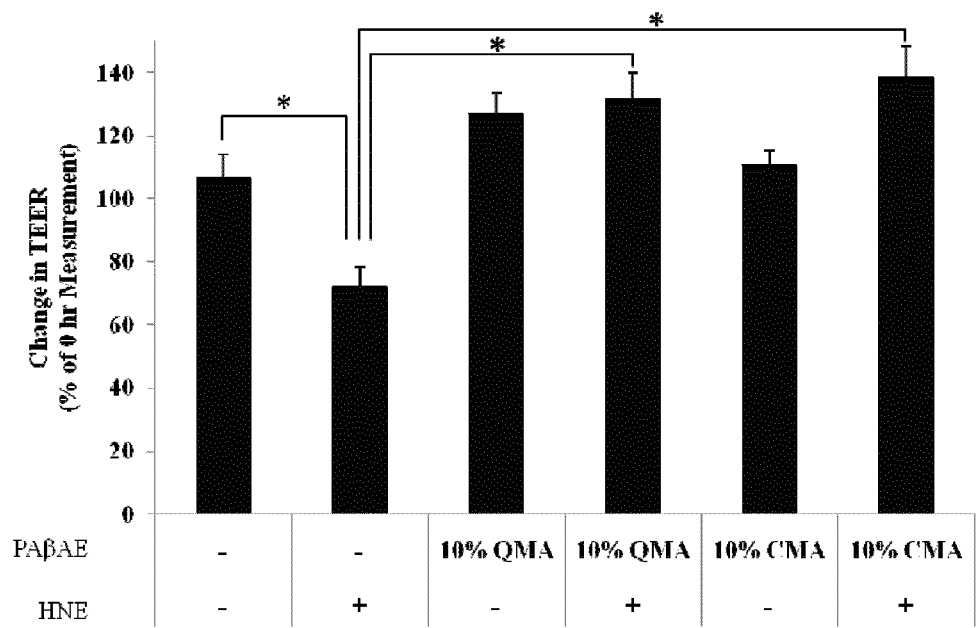
FIG. 17 is a graph showing the results of pre-treatment of a HUVEC monolayer with 10% QMA and 10% CMA degradation products in protecting cells from 4-hydroxy-2-transnonenal (HNE)-induced oxidative stress as measured by transendothelial electrical resistance measurements (TEER)

During the experiments, TEER was measured and was plotted as compared to the TEER measurement at 0 hours (FIG. 17). Upon analysis of that plot, treatment of the HUVEC monolayer with 10% CMA degradation products did not result in significant change in TEER as compared to the control (109±13). HNE treatment resulted in the decrease in TEER (75±2, p=0.059), while the treatment with 10% QMA degradation products resulted in a increase in TEER measurement (127±14, p=0.084). Co-treatment of HUVEC monolayer with degradation products of 10% QMA and 10% CMA prevented the HNE-induced decrease in TEER (p<0.05).

Examaple 12

Analysis of $H_2O_2$-Induced Oxidative Stress Injury to HUVECs in the Presence of PAβAE Degradation Products To assess the effect of $H_2O_2$-induced oxidative stress injury to HUVECs in the presence of PAβAE degradation products, cell viability was measured and used as a marker of the injury to the cells subsequent to exposure to the degradation products of PAβAE and $H_2O_2$. Briefly, HUVECs seeded at a cell density of 35,000 cells/cm$^2$ in a 96-well plate were treated with 100 µL of antioxidant or PAβAE solution for 2 hrs prior to adding 100 µL of 1 mM $H_2O_2$ solution (in cell media). Cells were exposed to antioxidants at different concentrations and a final $H_2O_2$ concentration of 500 µM. 24 hrs later, cell viability was measured using MTT assay as described above.

Figure 14C:
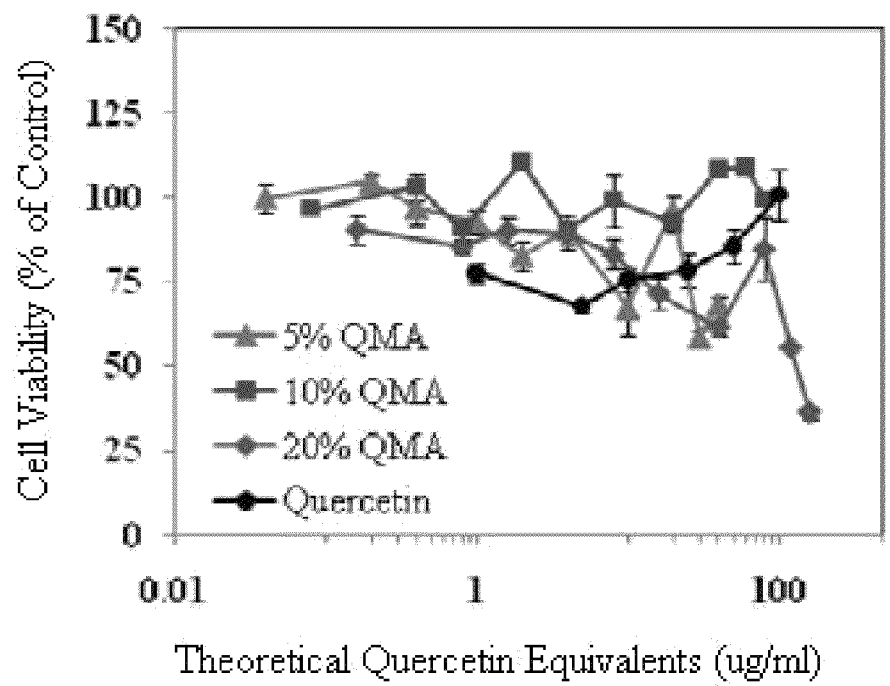
Figure 14D:
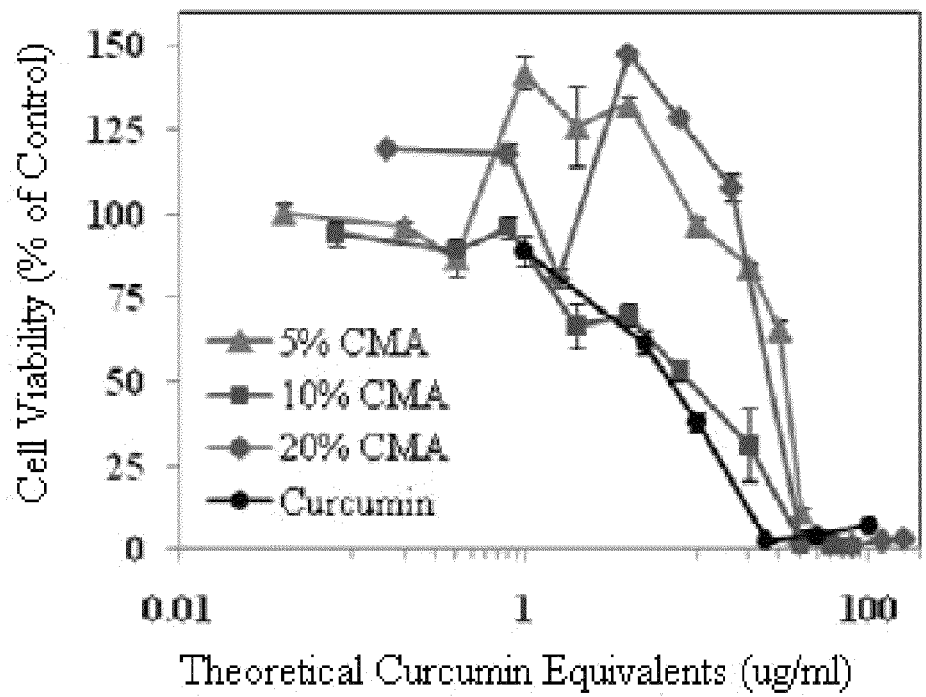
Figure 18:
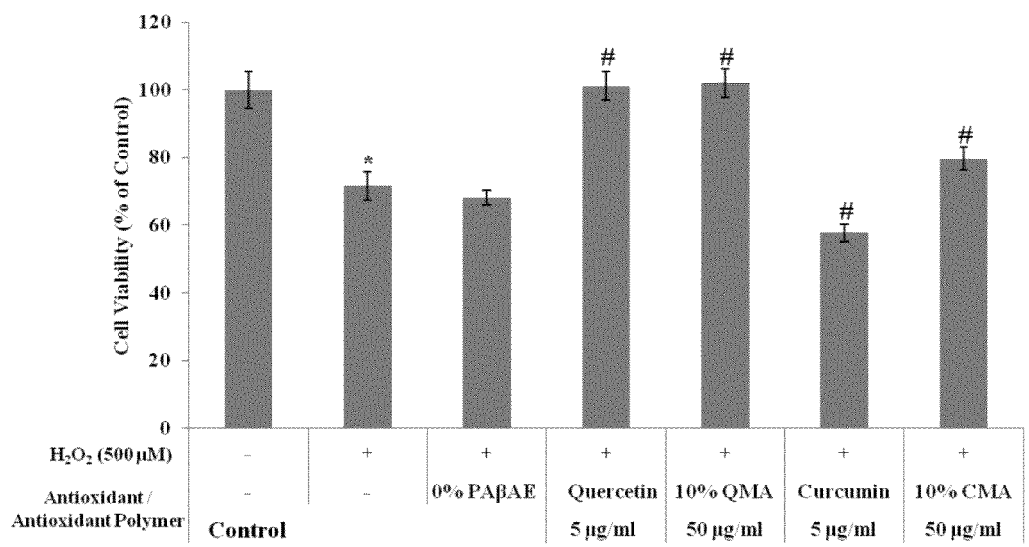
FIG. 18 is a graph showing the results of an analysis of the pre-treatment of a HUVEC monolayer with 10% QMA and 10% CMA degradation products in protecting cells from hydrogen peroxide ($H_2O_2$)-induced oxidative stress as measured by cell viability using a MTT assay.

At the end of the experiment, cell viability was measured and was plotted as compared to the viability of untreated control cells. (FIG. 18). Upon analysis of that plot, treatment of the HUVECs with 500 µM $H_2O_2$ decreased cell viability (72.9+7.4, p<0.001) as compared to the control (101.84+8). While pre-treatment with quercetin (101.13+3.8, p<0.001) and 10% QMA degradation products (101.97+2.9, P<0.001) resulted in a increase in cell viability as compared to the $H_2O_2$ treatment only (72.9+7.4). This confirms with results from other studies [27]. As shown in FIG. 14D, treatment of HUVECs with 5 µg/ml curcumin alone results in 40% cell death. Pre-treatment of HUVECs with curcumin (57.7+1.6, p<0.001), adds to the $H_2O_2$ injury (72.9+7.4). Protection provided by 10% CDA degradation products (80+2, p<0.001) was very modest and improved cell viability by less than 10%.

Discussion of Examples 1-12.

In the foregoing Examples, it was found that a modified poly(β-amino ester) chemistry could be used to successfully synthesize hydrolytically degradable cross-linked polymers for controlled release of the polyphenolic antioxidants quercetin and curcumin. Some of the advantages of the poly(β-amino ester) chemistry were: i) it did not require free-radical polymerization, thereby allowing loading of antioxidant drugs that are susceptible to free-radical damage; ii) the large libraries of commercial diacrylates [2,3] could be used to tune polymer properties (e.g. degradation rate, mechanical strength, etc.); and iii) the chemistry could be extended to other phenolic antioxidants.

In conjunction with the foregoing experiments, synthesized QMA and CMA were characterized using FT-IR and $^1$H-NMR spectroscopy. Acrylate functionalization of phenol groups in the antioxidants was verified by both FT-IR and $^1$H-NMR. QMA and CMA were synthesized with initial ratio of acryloyl chloride to quercetin at 4.5 and acryloyl chloride to curcumin ratio at 2.5. Synthesis of QMA resulted in 4.28 acrylate groups per molecule of quercetin, lower than the targeted number of 4.5 acrylate groups per molecule of quercetin. However, analysis of $^1$H-NMR spectra of CMA revealed 2.66 acrylate groups per molecule of curcumin, which was higher than 2.5, the initial ratio of acryloyl chloride to curcumin during the synthesis of CMA. Without wishing to be bound by any particular theory, it was believed that that finding could indicate the presence of free acrylic acid impurity (i.e., a byproduct of reaction of acryloyl chloride and water) remaining in the CMA product. Nonetheless, this slightly impure CMA was used for synthesis of PAβAE hydrogels. Presence of unreacted phenol groups in the monomers (QMA and CMA) would have hindered hydrogel synthesis using the conventional free radical polymerization technique as a result of the radical scavenging ability of phenol groups. The Michael type addition chemistry used in this work to synthesize a cross-linked network overcomes this inability of free radical polymerization to incorporate phenolic compounds in polymer backbone.

Examples 1-4 describe the synthesis and degradation characteristics of poly(β-amino ester) hydrogels that utilized a Michael type addition reaction between multifunctional acrylates and tetrafunctional primary diamines. In Examples 5-11, in addition to the commercial monomers PEG400DA and TTD, synthesized antioxidants multiacrylates were also used for PAβAE hydrogel synthesis. As shown in FIG. 13A and FIG. 13B, 4, 0% PAβAE hydrogels degrade completely within 60 min. However, inclusion of as low as 5% of relatively hydrophobic antioxidant multiacrylates slowed the degradation rate of PAβAE hydrogels such that the hydrogels completely degraded in 250-350 mins, demonstrating that one of the several advantages of this poly(β-amino ester) chemistry was that it can be easily tuned to synthesize slower degrading PAβAE hydrogels by controlling the ratio of hydrophilic monomers (PEG400DA and TTD) to relatively hydrophobic monomers (e.g. 1,3-butanediol diacrylate and hexamethylene diamine).

Quercetin is known to be a safe flavonol with relatively high IC$_{50}$ values of 113 µM for human normal liver cells L-02. [19]However, in contrast to the previously reported 18.4 µg/ml (61 µM) IC$_{50}$ value of quercetin for HUVECs, significant quercetin toxicity to HUVECs was note observed up to a concentration of 100 µg/ml [38]. IC$_{50}$ concentrations of curcumin PAβAE hydrogels decreased with increases in CMA content where 5% CMA, 10% CMA and 20% CMA had IC$_{50}$ concentrations of 62.1, 10.2 and 8.7 µg/ml. IC$_{50}$ values of pure curcumin for HUVECs was found to be 6.8 µg/ml, which was similar to the previously reported value of 10.8 µg/ml [51]. When the data in FIG. 14A and FIG. 14B was normalized with respect to antioxidant content in the PAβAE hydrogels as shown in FIG. 14C and FIG. 14D, the toxicity profiles of PAβAE hydrogels were similar to that of pure antioxidants, indicating that the toxicity of PAβAE hydrogels is the result of their antioxidant content. This is particularly evident in case of curcumin PAβAE hydrogels (FIG. 14D) where all curcumin PAβAE degradation products have an acute toxicity concentration of approximately 40 μg/ml curcumin equivalents.

Figure 16C:
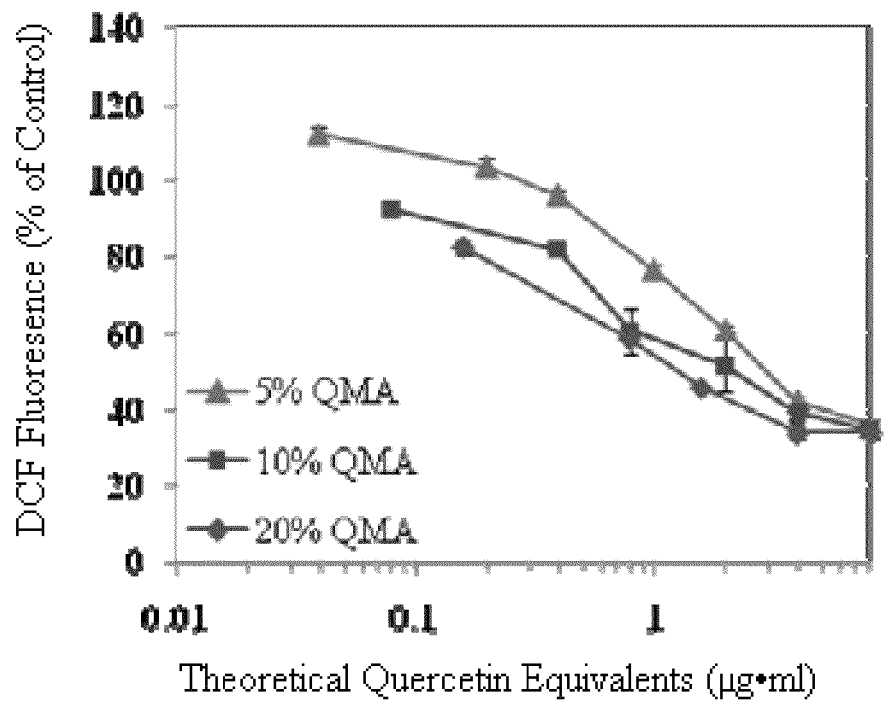
Figure 16D:
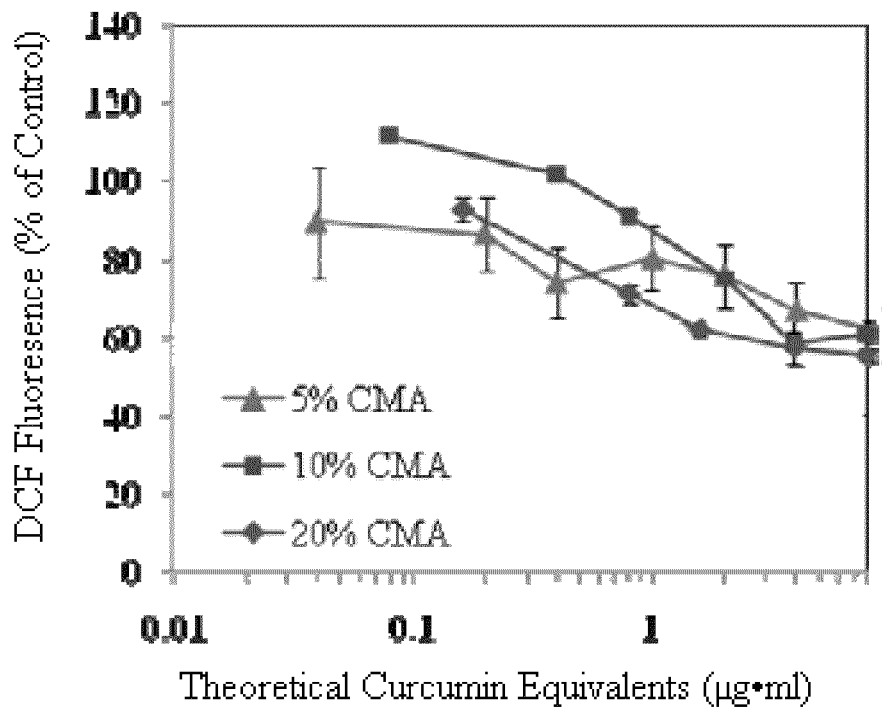

DCF fluorescence is a commonly used marker to study oxidative stress in the cells and was applied in the foregoing Examples to study the effect of PAβAE degradation products on oxidative stress levels in HUVECs. The model is based on the principle that DCF-DA (2',7'-dichlorodihydrofluorescein diacetate), a non-fluorescent ester form of the dye, is taken up by the cells and active esterases in the cells cleave it to a non-fluorescent product DCFH (2',7'-dichlorodihydrofluorescein). Free radicals in the cells can then react with DCFH to result in a fluorescent product DCF (2',7'-dichlorofluorescein). When the data in FIG. 16A and FIG. 16B was normalized with respect to the antioxidant content of PAβAE hydrogels as plotted in FIG. 16C and FIG. 16D, it was observed that suppression of DCF fluorescence by PAβAE degradation products is a result of antioxidant content in PAβAE.

4-hydroxy-2-trans-nonenal (HNE) is one of the by-products of lipid peroxidation that can further react with lysine, histidine and cysteine residues of proteins to form Michael-type adducts (HNE-protein) [14]. Protein bound FINE is also used as an oxidative stress marker specific towards lipid peroxidation [48]. It has been shown previously that HNE affects endothelial permeability via redox-dependant mechanism [45, 46]. Treatment of endothelial cells with antioxidants N-acetylcysteine (NAC) [46] and resveratrol [30] have shown suppression of HNE-induced oxidative stress and protection from endothelial barrier dysfunction. In the foregoing Examples, FINE was used to initiate oxidative stress injury to HUVECs and studied the protection by PAβAE degradation products as measured by TEER. As shown in FIG. 17, 10% QMA and 10% CMA degradation products at a concentration of 100 μg/ml protected HUVECs from HNE-induced decrease in the TEER. Based on the ability of PAβAE degradation products to suppress background oxidative stress in the cells, it is hypothesized that antioxidant activity of PAβAE degradation products protected the HUVEC monolayer from FINE-induced oxidative damage.

The single-step polymerization method for synthesis of poly(β-amino ester) hydrogels was successfully applied in the foregoing experiments for incorporating phenolic antioxidants into the PAβAE network by acrylate functionalization of polyphenols. Cytotoxicity of PAβAE degradation products was a function of both the type of antioxidant used and the percent antioxidant content in PAβAE, where quercetin PAβAE had very little to no cytotoxicity and curcumin PAβAE had cytotoxicity similar to that of pure curcumin. Also, degradation products of PAβAE hydrogels possessed antioxidant activity. Treatment of HUVECs with PAβAE degradation products suppressed background oxidative stress in the cells and also protected cells from FINE-induced oxidative injury as measured by TEER measurements. In summary, the foregoing experiment provides a method to synthesize PAβAE hydrogels for controlled release of polyphenolic antioxidants with tunable degradation properties that can then be used to reduce an amount of oxidative stress.

$H_2O_2$ at submillimolar concentrations induce apoptosis in endothelial cells via redox dependant pathways [52]. It has been shown that several polyphenolic flavanoids including quercetin have antiapoptotic effect against $H_2O_2$ injury [53]. In the foregoing Examples, $H_2O_2$ was used to initiate oxidative stress injury to HUVECs and studied the protection by PAβAE degradation products as measured by cell viability. As shown in FIG. 18, 10% QMA degradation products at a concentration of 50 μg/ml protected HUVECs from $H_2O_2$-induced decrease in cell viability. Based on the ability of 10% QMA degradation products to suppress background oxidative stress in the cells, it is hypothesized that antioxidant activity of 10% QMA degradation products protected the HUVEC monolayer from $H_2O_2$-induced oxidative damage.

Throughout this document, various references are mentioned. All such references are incorporated herein by reference, including the references set forth in the following list:

REFERENCES

1. Akinc, A.; Lynn, D. M.; Anderson, D. G.; Langer, R. *J Am ChemSoc* 2003, 125, 5316.
2. Anderson, D. G.; Lynn, D. M.; Langer, R., Semi-automated synthesis and screening of a large library of degradable cationic polymers for gene delivery. *Angewandte Chemie-International Edition* 2003, 42, (27), 3153-3158.
3. Anderson, D. G.; Tweedie, C. A.; Hossain, N.; Navarro, S. M.; Brey, D. M.; Van Vliet, K. J.; Langer, R.; Burdick, J. A., A combinatorial library of photocrosslinkable and degradable materials. *Advanced Materials* 2006, 18, (19), 2614-+.
4. Badylak, S. F.; Valentin, J. E.; Ravindra, A. K.; McCabe, G. P.; Stewart-Akers, A. M., Macrophage Phenotype as a Determinant of Biologic Scaffold Remodeling. *Tissue Engineering Part A* 2008, 14, (11), 1835-1842.
5. Bat, E.; Planting a, J. A.; Harmsen, M. C.; van Luyn, M. J. A.; Feijen, J.; Grijpma, D. W., In vivo behavior of trimethylene carbonate and epsilon-caprolactone-based (co)polymer networks: Degradation and tissue response. *Journal of Biomedical Materials Research Part A* 2010, 95A, (3), 940-949.
6. Berry, D.; Lynn, D. M.; Sasisekharan, R.; Langer, R. *Chem Bio* 2004, 11, 487.
7. Biswal, D.; Wattamwar, P. P.; Dziubla, T. D.; Hilt, J. Z., A single-step polymerization method for poly(β-amino ester) biodegradable hydrogels. *Macromolecules* Submitted.
8. Boudreaux, C. J.; Bunyard, W. C.; McCormick, C. L., Controlled activity polymers. 8. Copolymers of acrylic acid and isomeric N-alkylacrylamide with pendent beta-naphthol esters moieties: Synthesis and characterization. *Journal of Controlled Release* 1996, 40, (3), 223-233.
9. Brandrup, J.; Immergut, E. H.; Grulke, E. A. *Polymer handbook*. 4th ed., New York: John Wiley, 1999.
10. Brey, D. M.; Ifkovits, J. L.; Mozia, R. I.; Katz, J. S.; Burdick, J. A *ActaBiomat* 2008, 4, 207.
11. Brey, D. M.; Reickson, I.; Burdick, J. A. *J Biomed Mater Res A.* 2008, 85, 731.
12. Brito, L.; Little, S.; Langer, R.; Amiji, M. *Biomacromolecules* 2008, 9, 1179.
13. Burkoth, A. K.; Anseth, K. A. *Biomaterials* 2000, 21, 2395.
14. Butterfield, D. A.; Lange, M. L. B.; Sultana, R., Involvements of the lipid peroxidation product, HNE, in the pathogenesis and progression of Alzheimer's disease. *Biochimica Et Biophysica Acta-Molecular and Cell Biology of Lipids* 2010, 1801, (8), 924-929.
15. Chen, J.; Huang, S-W.; Liu, M.; Zhuo, R-X. *Polymer* 2007, 48, 675.
16. Devalapally, H.; Shenoy, D.; Little, S.; Langer, R.; Amiji, M. *Cancer Chemotherapy and Pharmacology* 2007, 59, 477.
17. Dïnç, C. Ö.; Kïbarer, G.; Güner, A. *J Appl Poly Sci* 2010, 117, 1100.
18. Fleming, C.; Maldjian, A.; Da Costa, D.; Rullay, A. K.; Haddleton, D. M.; John, J. S.; Penny, P.; Noble, R. C.; Cameron, N. R.; Davis, B. G., A carbohydrate-antioxidant hybrid polymer reduces oxidative damage in spermatozoa and enhances fertility. *Nature Chemical Biology* 2005, 1, (5), 270-274.

19. Frimpong, R. A.; Fraser, S.; Hilt, J. Z. *J Biomed Mater Res: Part A* 2006, 80A, 1.

20. Fu, K.; Pack, D. W.; Klibanov, A. M.; Langer, R., Visual evidence of acidic environment within degrading poly(lactic-co-glycolic acid) (PLGA) microspheres. *Pharmaceutical Research* 2000, 17, (1), 100-106.

21. Green, J. J.; Langer, R.; Anderson, D. G. *Accounts of Chemical Research* 2008, 41, 749.

22. Hawkins, A. M.; Milbrandt, T. A.; Puleo, D. A.; Hilt, J. Z. *Acta Bio* 2011 (in press).

23. Hoffman, A. S *Adv Drug Delivery Rev* 2002, 43, 3.

24. Ifkovits, J. L.; Burdick, J. A. *Tissue Engineering* 2007, 13, 2369.

25. Jere, D.; Xu, C-X.; Arote, R.; Yun, C-H.; Cho, M-H.; Cho, C-S. *Biomaterial* 2008, 29, 2535.

26. Jiang, W. W.; Su, S. H.; Eberhart, R. C.; Tang, L. P., Phagocyte responses to degradable polymers. *Journal of Biomedical Materials Research Part A* 2007, 82A, (2), 492-497.

27. Kaplan, S. S.; Basford, R. E.; Mora, E.; Jeong, M. H.; Simmons, R. L., Biomaterial-Induced Alterations of Neutrophil Superoxide Production. *Journal of Biomedical Materials Research* 1992, 26, (8), 1039-1051.

28. Kim, T.; Seo, H. J.; Choi, J. S.; Yoon, J. K.; Baek, J-u.; Kim, K.; Park, J-S. *Bioconjugate Chem.* 2005, 16, 1140.

29. Krevelen, D. W. v., *Properties of polymers: their correlation with chemical structure, their numerical estimation and prediction from additive group contributions.* 3rd, completely rev. ed., Amsterdam; New York: Elsevier. xxii, 1990, 875 p.

30. Kutuk, O.; Adli, M.; Poli, G.; Basaga, H., Resveratrol protects against 4-HNE induced oxidative stress and apoptosis in Swiss 3T3 fibroblasts. *Biofactors* 2004, 20, (1), 1-10.

31. Lee, J-S.; Green, J. J.; Love, K.; Sunshine, J.; Langer, R.; Anderson, D. G. *Nano Let* 2009, 9, 2402.

32. Li, N.; Liu, J. H.; Zhang, J.; Yu, B. Y., Comparative evaluation of cytotoxicity and antioxidative activity of 20 flavonoids. *Journal of Agricultural and Food Chemistry* 2008, 56, (10), 3876-3883.

33. Lim, Y. B.; Kim, C. H.; Kim, K.; Kim, S. W.; Park, J. S. *J Am ChemSoc* 2000, 122, 6524e5.

34. Liu, W. E.; Ma, M. L.; Bratlie, K. M.; Dang, T. T.; Langer, R.; Anderson, D. G., Real-time in vivo detection of biomaterial-induced reactive oxygen species. *Biomaterials* 2011, 32, (7), 1796-1801.

35. Lynn, D. M.; Anderson, D. G.; Putnam, D.; Langer, R. *J Am ChemSoc* 2001, 123, 8155.

36. Lynn, D. M.; Langer, R. *J. Am. Chem. Soc.* 2000, 122, 10761.

37. Mann, B. K.; Gobin, A. S.; Tsai, A. T.; Schmedlen, R. H.; West, J. L. *Biomaterials* 2001, 22, 3045.

38. Matsuo, M.; Sasaki, N.; Saga, K.; Kaneko, T., Cytotoxicity of flavonoids toward cultured normal human cells. *Biological & Pharmaceutical Bulletin* 2005, 28, (2), 253-259.

39. Schmidt, D. R.; Kao, W. J., Monocyte activation in response to polyethylene glycol hydrogels grafted with RGD and PHSRN separated by interpositional spacers of various lengths. *Journal of Biomedical Materials Research Part A* 2007, 83A, (3), 617-625.

40. Shen, Y.; Tang, H.; Zhan, Y.; VanKirk, E. A.; Murdoch, W. J. *Nanomedicine: nanotechnology, biology and medicine* 2009, 5, 192.

41. Shenoy, D.; Little, S.; Langer, R.; Amiji, M. *Pharmaceutical research* 2005, 22, 2017.

42. Spizzirri, U. G.; Iemma, F.; Puoci, F.; Cirillo, G.; Curcio, M.; Parisi, O. I.; Picci, N., Synthesis of Antioxidant Polymers by Grafting of Gallic Acid and Catechin on Gelatin. *Biomacromolecules* 2009, 10, (7), 1923-1930.

43. Tan, H.; Marra, K. G. Materials 2010, 3, 1746.

44. Udipi, K.; Ornberg, R. L.; Thurmond, K. B.; Settle, S. L.; Forster, D.; Riley, D., Modification of inflammatory response to implanted biomedical materials in vivo by surface bound superoxide dismutase mimics. *Journal of Biomedical Materials Research* 2000, 51, (4), 549-560.

45. Usatyuk, P. V.; Natarajan, V., Role of mitogen-activated protein kinases in 4-hydroxy-2-nonenal-induced actin remodeling and barrier function in endothelial cells. *Journal of Biological Chemistry* 2004, 279, (12), 11789-11797.

46. Usatyuk, P. V.; Parinandi, N. L.; Natarajan, V., Redox regulation of 4-hydroxy-2-nonenal-mediated endothelial barrier dysfunction by focal adhesion, adherens, and tight junction proteins. Journal of Biological Chemistry 2006, 281, (46), 35554-35566.

47. Wang, Y. Z.; Singh, A.; Xu, P.; Pindrus, M. A.; Blasioli, D. J.; Kaplan, D. L., Expansion and osteogenic differentiation of bone marrow-derived mesenchymal stem cells on a vitamin C functionalized polymer. *Biomaterials* 2006, 27, (17), 3265-3273.

48. Wattamwar, P. P.; Hardas, S.; Butterfield, D. A.; Anderson, K. W.; Dziubla, T. D., Tuning of the Pro-oxidant and Antioxidant Activity of Trolox Through the Controlled Release from Biodegradable Poly(trolox ester) Polymers. *J Biomed Mater Res A* In Press.

49. Wattamwar, P. P.; Mo, Y. Q.; Wan, R.; Palli, R.; Zhang, Q. W.; Dziubla, T. D., Antioxidant Activity of Degradable Polymer Poly(trolox ester) to Suppress Oxidative Stress Injury in the Cells. *Advanced Functional Materials* 2010, 20, (1), 147-154.

50. Williams, S. R.; Lepene, B. S.; Thatcher, C. D.; Long, T. E., Synthesis and Characterization of Poly(ethylene glycol)-Glutathione Conjugate Self-Assembled Nanoparticles for Antioxidant Delivery. *Biomacromolecules* 2009, 10, (1), 155-161.

51. Woo, H. B.; Shin, W. S.; Lee, S.; Ahn, C. M., Synthesis of novel curcumin mimics with asymmetrical units and their anti-angiogenic activity. *Bioorganic & Medicinal Chemistry Letters* 2005, 15, (16), 3782-3786.

52. Choi Y J, Jeong Y J, Lee Y J, Kwon H M, Kang Y H. (−)Epigallocatechin gallate and q uercetin enhance survival signaling in response to oxidant-induced human endothelial apoptosis. *J Nutr* 2005; 135:707-13.

53. Choi Y J, Kang J S, Park J H Y, Lee Y J, Choi J S, Kang Y H. Polyphenolic flavonoids differ in their antiapoptotic efficacy in hydrogen peroxide-treated human vascular endothelial cells. *J Nutr* 2003; 133:985-91.

What is claimed is:

1. A compound, comprising a plurality of monomeric portions, each monomeric portion including an antioxidant molecule interposed between at least two acrylate molecules, where at least one acrylate molecule of each monomeric portion is linked by a diamine molecule to an acrylate molecule of an adjacent monomeric portion to thereby form a polymer.

2. The compound of claim 1, wherein the polymer is cross-linked.

3. The compound of claim 1, wherein the monomeric portion comprises a diacrylate antioxidant or a multiacrylate antioxidant.

4. The compound of claim 1, wherein the acrylate molecule is selected from acrylic acid and methacrylic acid.

5. The compound of claim 1, wherein the antioxidant molecule is a phenolic antioxidant.

6. The compound of claim 1, wherein the antioxidant molecule is selected from the group consisting of 6-hydroxy-2,5,7,8-tetramethylchroman-2-carboxylic acid, tocopherol, (−)-epicatechin, acacetin, apigenin, azaleatin, baicalein, caffeic acid, catechin, chlorogenic acid, chrysin, cichoric acid, a curcuminoid, cyanidin, daidzein, delphinidin, diosmin, ellagic acid, epicatechin, epigallocatechin gallate, eriodictyol, eugenol, eupatorin, galangin, gallic acid, genistein, glycitein, hesperetin, isorhamnetin, kaempferol, luteolin, luteolin, malvidin, matairesinol, myricetin, naringenin, oroxylin A, pelargonidin, peonidin, petunidin, pinoresinol, quercetin, resorcinol, resveratrol, rosmarinic acid, rutin hydrate, silibinin, taxifolin, theaflavin, and analogs thereof.

7. The compound of claim 6, wherein the curcuminoid is curcumin.

8. The compound of claim 1, wherein the diamine molecule comprises a primary diamine molecule, a secondary diamine molecule, or combinations thereof.

9. The compound of claim 1, wherein the diamine molecule is selected from the group consisting of 4,7,10-trioxa-1,13-tridecane diamine, 2,2' (ethylenedioxy)bis ethylamine, hexamethyldiamine, piperazine, spermine, spermidine, cadaverine, putrescine, and combinations thereof.

10. The compound of claim 1, wherein a molar ratio of acrylate reactive groups to amine reactive groups in the polymer is about 0.25 to about 1.65.

11. The compound of claim 10, wherein the molar ratio of acrylate reactive groups to amine reactive groups in the polymer is about 1.2.

12. The compound of claim 1, wherein the compound comprises one or more unreacted amine groups.

13. The compound of claim 1, further comprising one or more additional diacrylate molecules linked to the diamine molecule.

14. The compound of claim 13, wherein the one or more additional diacrylate molecules are selected from the group consisting of poly(ethylene glycol) diacrylate, diethylene glycol diacrylate, 1,3-butanedioldiacrylate, and combinations thereof.

15. The compound of claim 13, wherein the ratio of the monomeric portion to the one or more additional diacrylate molecules is about 0 percent to about 20 percent.

16. The compound of claim 1, wherein the polymer is a hydrogel.

17. A method of reducing oxidative stress, comprising administering to a subject in need thereof an effective amount of a compound of claim 1.

18. The method of claim 17, wherein administering the compound to the subject reduces an amount of reactive oxygen species, reactive nitrogen species, or both.

19. The method of claim 17, wherein administering an effective amount of the compound comprises applying the compound to a tissue or organ of a subject.

20. The method of claim 17, wherein the compound is configured to degrade within a subject over a time period of about 3 hours to about 5 hours to thereby provide a sustained release of the antioxidant molecule.

21. The method of claim 17, wherein the polymer is crosslinked.

22. The method of claim 17, wherein the monomeric portion comprises a diacrylate antioxidant or a multiacrylate antioxidant.

23. The method of claim 17, wherein the acrylate molecule is selected from the group consisting of acrylic acid and methacrylic acid.

24. The method of claim 17, wherein the antioxidant molecule is a phenolic antioxidant.

25. The method of claim 17, wherein the antioxidant molecule is selected from the group consisting of 6-hydroxy-2,5,7,8-tetramethylchroman-2-carboxylic acid, tocopherol, (−)-epicatechin, acacetin, apigenin, azaleatin, baicalein, caffeic acid, catechin, chlorogenic acid, chrysin, cichoric acid, a curcuminoid, cyanidin, daidzein, delphinidin, diosmin, ellagic acid, epicatechin, epigallocatechin gallate, eriodictyol, eugenol, eupatorin, galangin, gallic acid, genistein, glycitein, hesperetin, isorhamnetin, kaempferol, luteolin, luteolin, malvidin, matairesinol, myricetin, naringenin, oroxylin A, pelargonidin, peonidin, petunidin, pinoresinol, quercetin, resorcinol, resveratrol, rosmarinic acid, rutin hydrate, silibinin, taxifolin, theaflavin, and analogs thereof.

26. The method of claim 25, wherein the curcuminoid is curcumin.

27. The method of claim 17, wherein the diamine molecule comprises a primary diamine molecule, a secondary diamine molecule, or combinations thereof.

28. The method of claim 17, wherein the diamine molecule is selected from the group consisting of 4,7,10-trioxa-1,13-tridecane diamine, 2,2' (ethylenedioxy)bis ethylamine, hexamethyldiamine, piperazine, spermine, spermidine, cadaverine, putrescine, and combinations thereof.

29. The method of claim 17, wherein a molar ratio of acrylate reactive groups to amine reactive groups in the polymer is about 0.25 to about 1.65.

30. The method of claim 29, wherein the molar ratio of acrylate reactive groups to amine reactive groups in the polymer is about 1.2.

31. The method of claim 17, wherein the compound comprises one or more unreacted amine groups.

32. The method of claim 17, further comprising one or more additional diacrylate molecules linked to the diamine molecule, wherein the one or more additional diacrylate molecules are selected from the group consisting of poly(ethylene glycol) diacrylate, diethylene glycol diacrylate, 1,3-butanediol diacrylate, and combinations thereof.

33. The method of claim 32, wherein the ratio of the monomeric portion to the one or more additional diacrylate molecules is about 0 percent to about 20 percent.

34. The method of claim 17, wherein the polymer is a hydrogel.

* * * * *

UNITED STATES PATENT AND TRADEMARK OFFICE
CERTIFICATE OF CORRECTION

PATENT NO.        : 8,642,087 B1
APPLICATION NO.   : 13/290752
DATED             : February 4, 2014
INVENTOR(S)       : Dziubla et al.

It is certified that error appears in the above-identified patent and that said Letters Patent is hereby corrected as shown below:

IN THE CLAIMS:

Claim 6, col. 39, line 13 and 14: Change "luteolin, luteolin" to "luteolin"

Claim 14, col. 39, line 42: Change "1,3-butanedioldiacrylate" to "1,3-butanediol diacrylate"

Claim 25, col. 40, line 23 and 24: Change "luteolin, luteolin" to "luteolin"

Signed and Sealed this
Twenty-fourth Day of June, 2014

Michelle K. Lee
*Deputy Director of the United States Patent and Trademark Office*